May 14, 1929.    R. A. STEPS    1,713,058
FULLY CENTRALIZED MIXER TYPE CENTRIFUGAL CONTROL
Filed Sept. 1, 1927    8 Sheets-Sheet 1
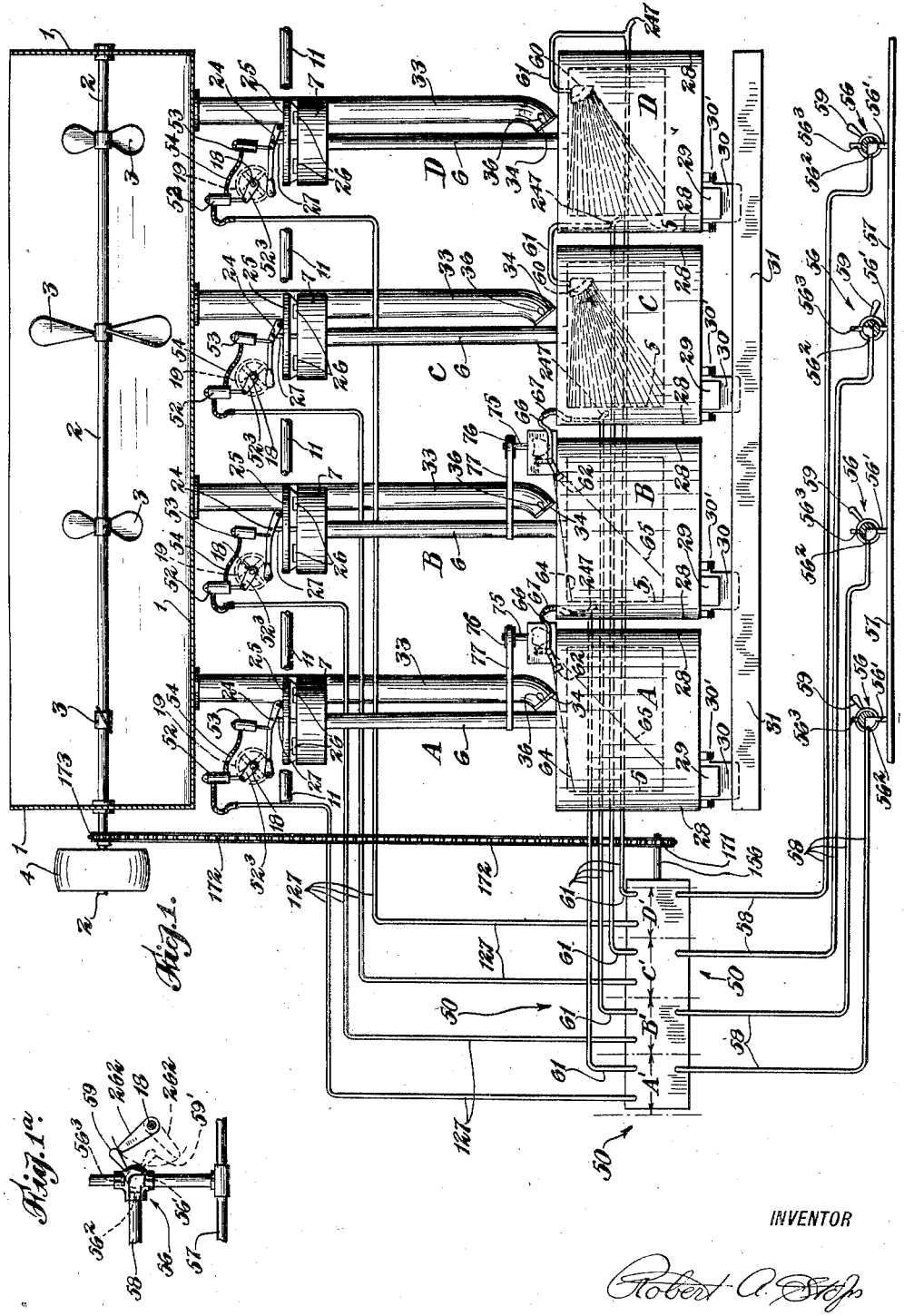
INVENTOR
Robert A. Steps

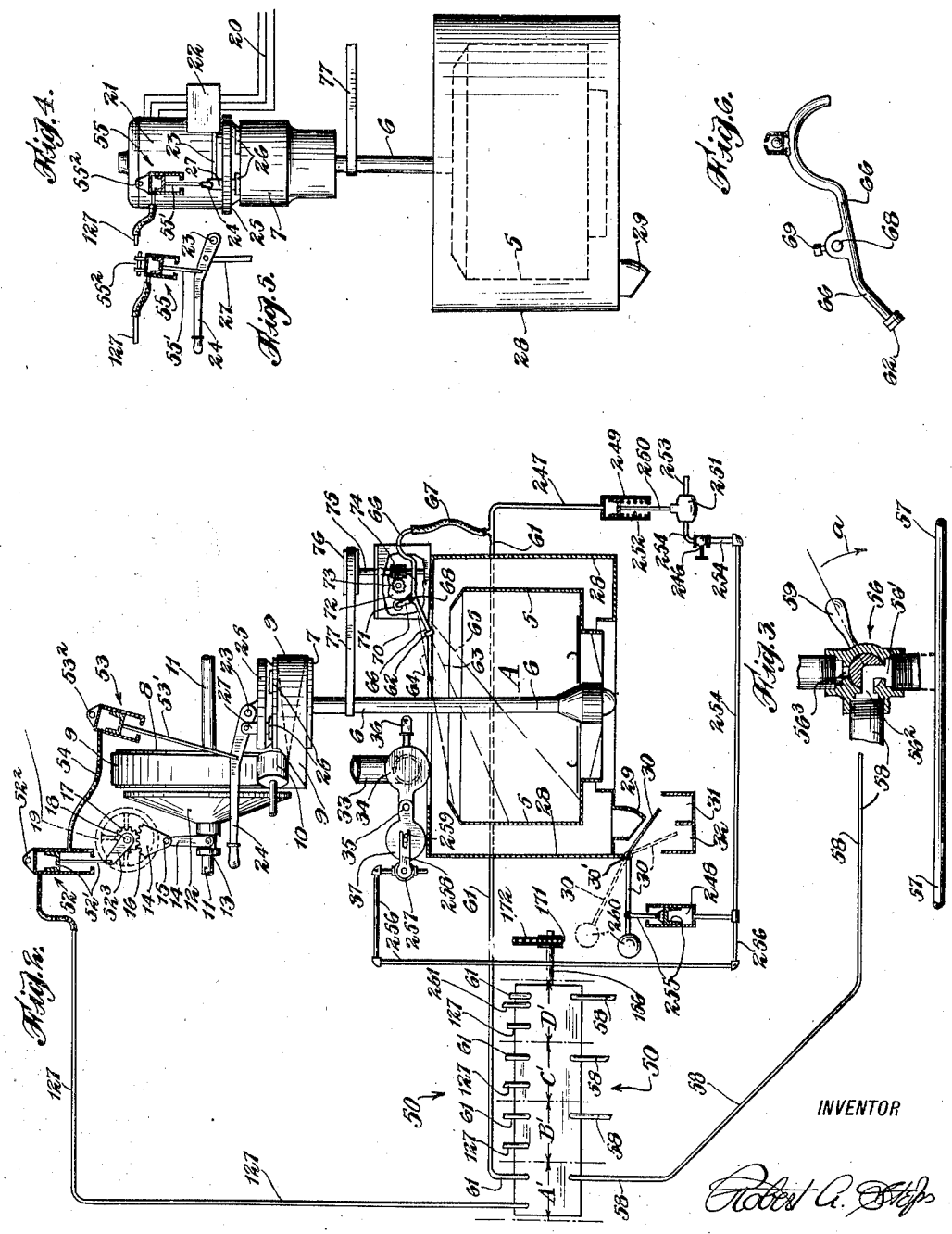

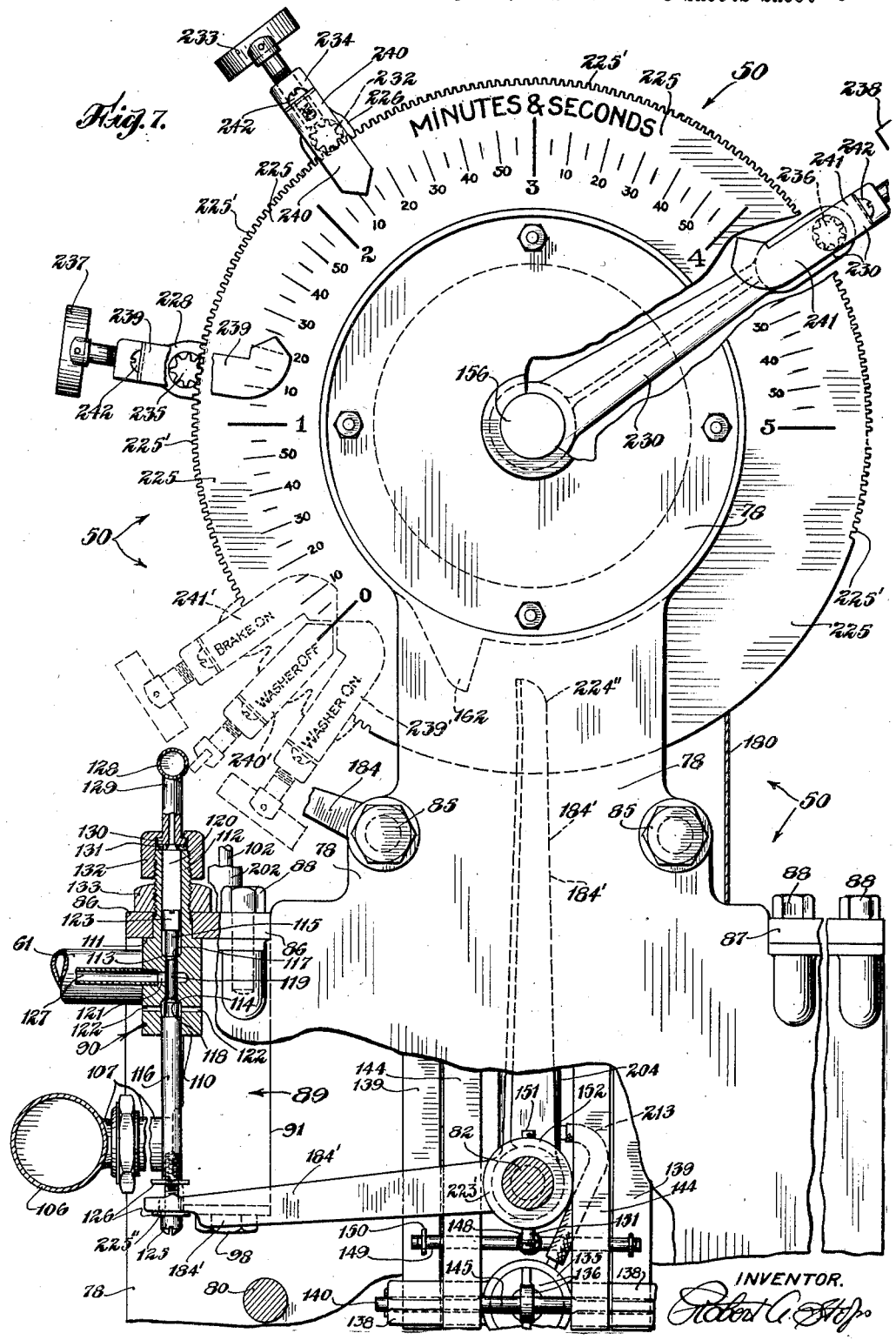

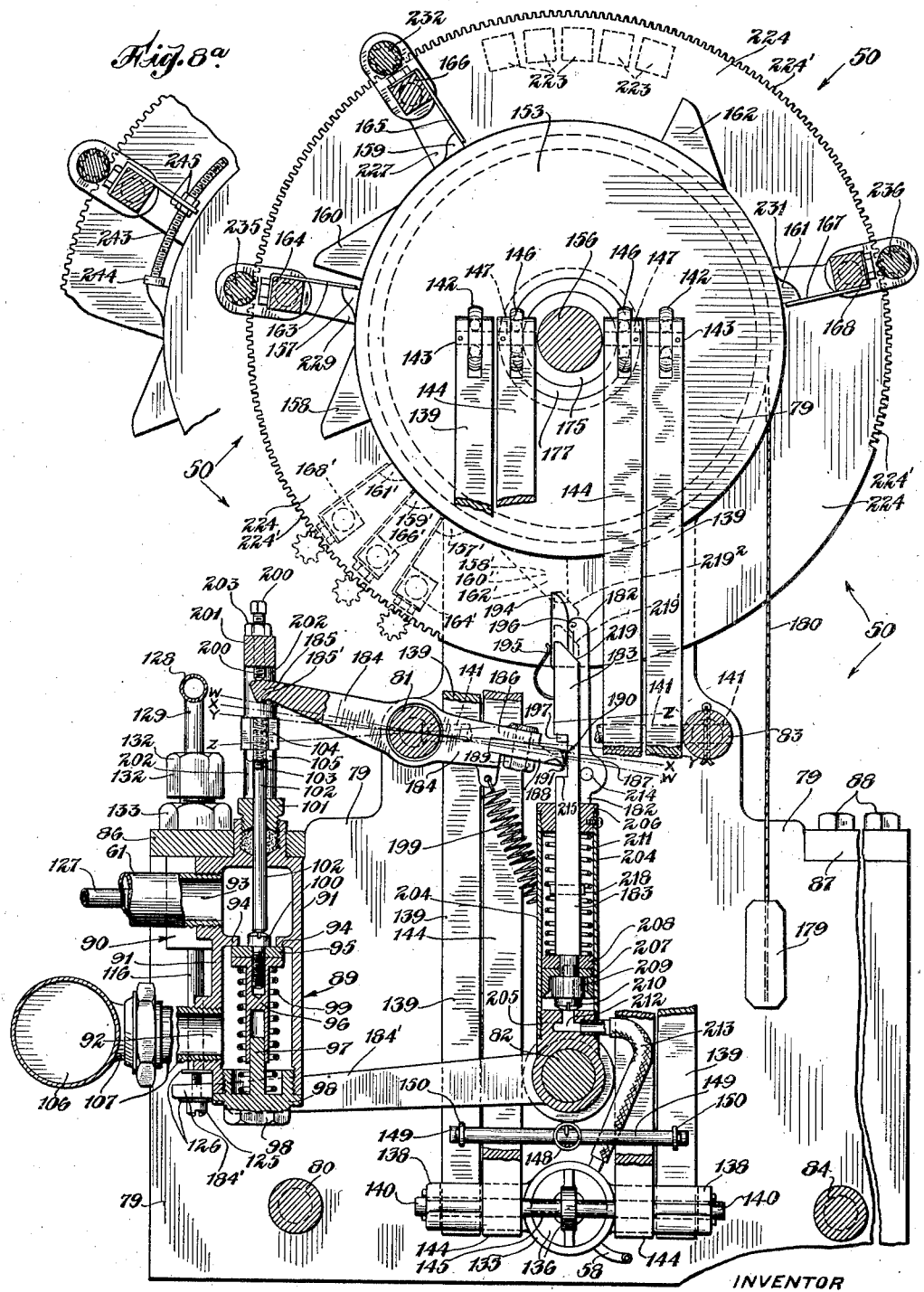

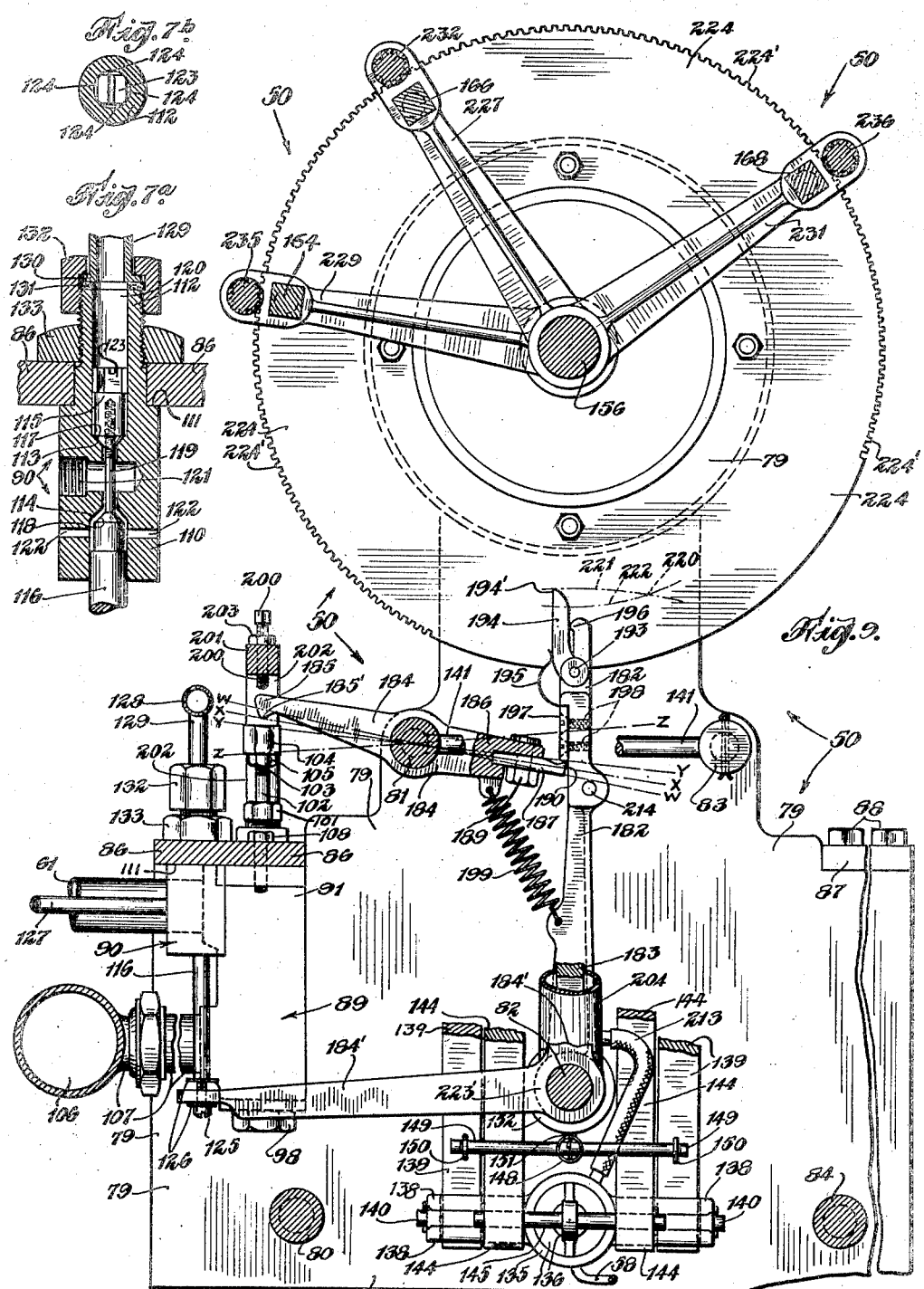

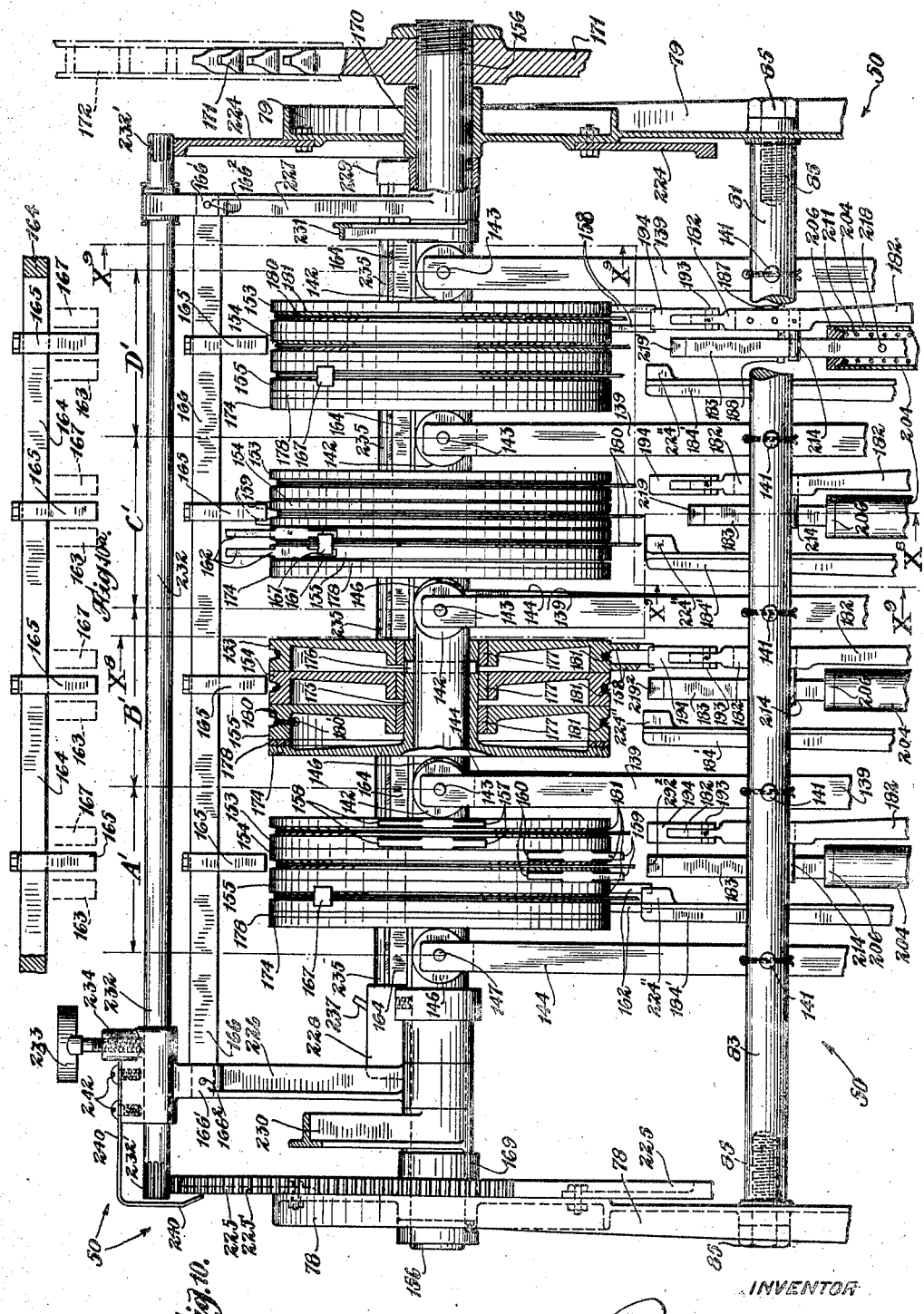

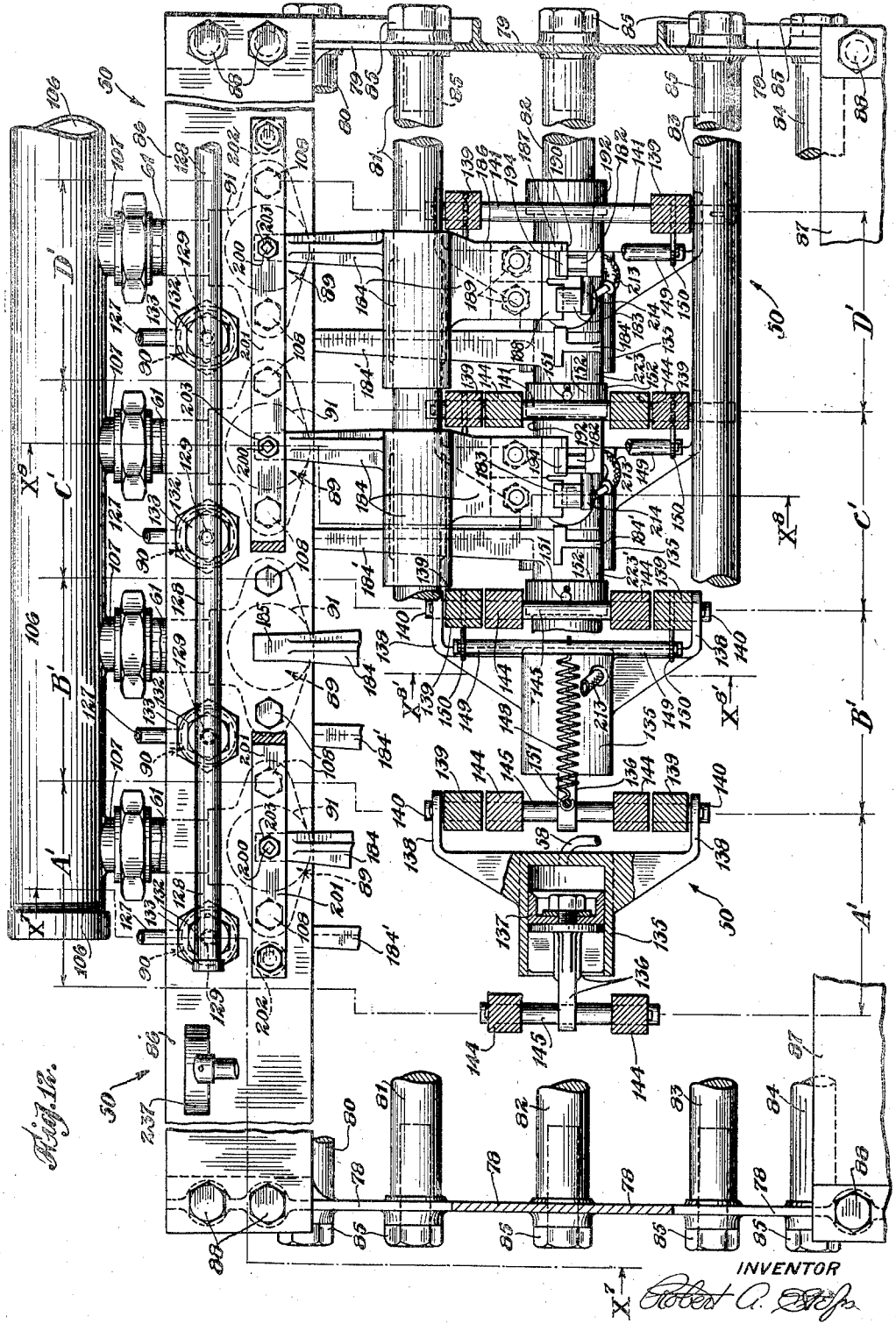

Patented May 14, 1929.

1,713,058

UNITED STATES PATENT OFFICE.

ROBERT ALEXANDER STEPS, OF LOS ANGELES, CALIFORNIA.

FULLY-CENTRALIZED MIXER-TYPE CENTRIFUGAL CONTROL.

Application filed September 1, 1927. Serial No. 216,919.

This invention relates to important improvements in mixer type centrifugal controls.

These are the controls which collectively govern all the centrifugals in a mixer group and which provide for the collective changing or adjusting of any cycle period of function practically simultaneously for all the centrifugals in the mixer group.

Heretofore, my controls of this character have been considerably centralized but not completely so. They provided for the collective changing or adjusting of some of the cycle periods or functions, but they did not provide for collectively changing or adjusting the amount of washing fluid supplied to each centrifugal during its cycle. This had to be changed individually for each centrifugal.

It is the object of this present invention to improve upon and expand this general class of mixer type centrifugal controls which I invented, to the extent of fully centralizing the same including the collective control and adjustment of the amount of washing fluid dispensed to each centrifugal in the mixer group.

Consequently, this invention, in addition to other benefits and features which will be hereinafter described, is broadly characterized by so arranging the parts as to permit the following: first, the collective changing for all the centrifugals of the time period preceding the moment when the washing action commences in any centrifugal; second, the collective changing for all the centrifugals of the time period preceding the moment when the washing action ceases in any centrifugal; and third, the collective changing for all the centrifugals of the time period preceding the moment at which the centrifugal is stopped, by which I principally, but not necessarily, mean the moment when the power is cut off or the brake applied to bring the centrifugal to rest. My arrangement is such, however, that an increase in any one of said three time periods does not produce an increase in the others, nor does a decrease in any one produce a proportionate decrease in the others. My adjusting arrangement, although collective for all the centrifugals in the group, nevertheless permits a large flexibility between the three adjustments themselves, and for practical purposes this flexibility is a very essential feature in any successful group or master control.

Obviously the complete centralization of the various adjustments which I thus procure, including the flexibility between them, is beneficial not only because of the ease and convenience with which these adjustments can then be made practically simultaneously for all the centrifugals, but also because important simplifications in the apparatus itself can then be realized through this complete centralization.

In respect to the improvements above mentioned, I believe my invention is basic and pioneer.

In this connection it will be understood that prior to the advent of my mixer type controls there were in use only individual controls, i. e. a complete individual control for each centrifugal which made it necessary to individually change each and every cycle period or function individually for each and every centrfugal. Obviously this was quite laborious, and therefore my mixer type control which permits the collective changing of these periods practically simultaneously for all the centrifugals, and from a centralized adjusting point, accomplishes a substantial improvement in the art.

Other features, advantages and objects of the invention will become clear by consideration of the accompanying drawings, also from the following description of the invention, and from the appended claims.

Fig. 1 is a diagrammatic view, partly in section, showing one form of my invention as applied to a mixer of four centrifugals.

Fig. 1a illustrates a detail of construction that will be referred to later.

Fig. 2 is a diagrammatic view similar to Fig. 1, but showing only one centrifugal, and showing in connection therewith several detailed parts which were omitted from Fig. 1 for purposes of clearness.

Fig. 3 is an enlarged sectional view showing a valve used in connection with the form of my invention illustrated in Fig. 2.

Fig. 4 illustrates certain features of my invention as connected with a centrifugal of a different form or type from the centrifugal illustrated in Fig. 2.

Fig. 5 is a side view showing some of the parts illustrated in Fig. 4.

Fig. 6 illustrates a detail of construction that will be referred to later.

Fig. 7 is a front view partly in section, illustrating the particular form of this invention which I have elected to describe in this application. In this figure, for purposes of clearness, certain parts have been broken away, and other parts have been shown in section taken along a broken line marked $X^7-X^7$ in Fig. 12.

Figure 11:
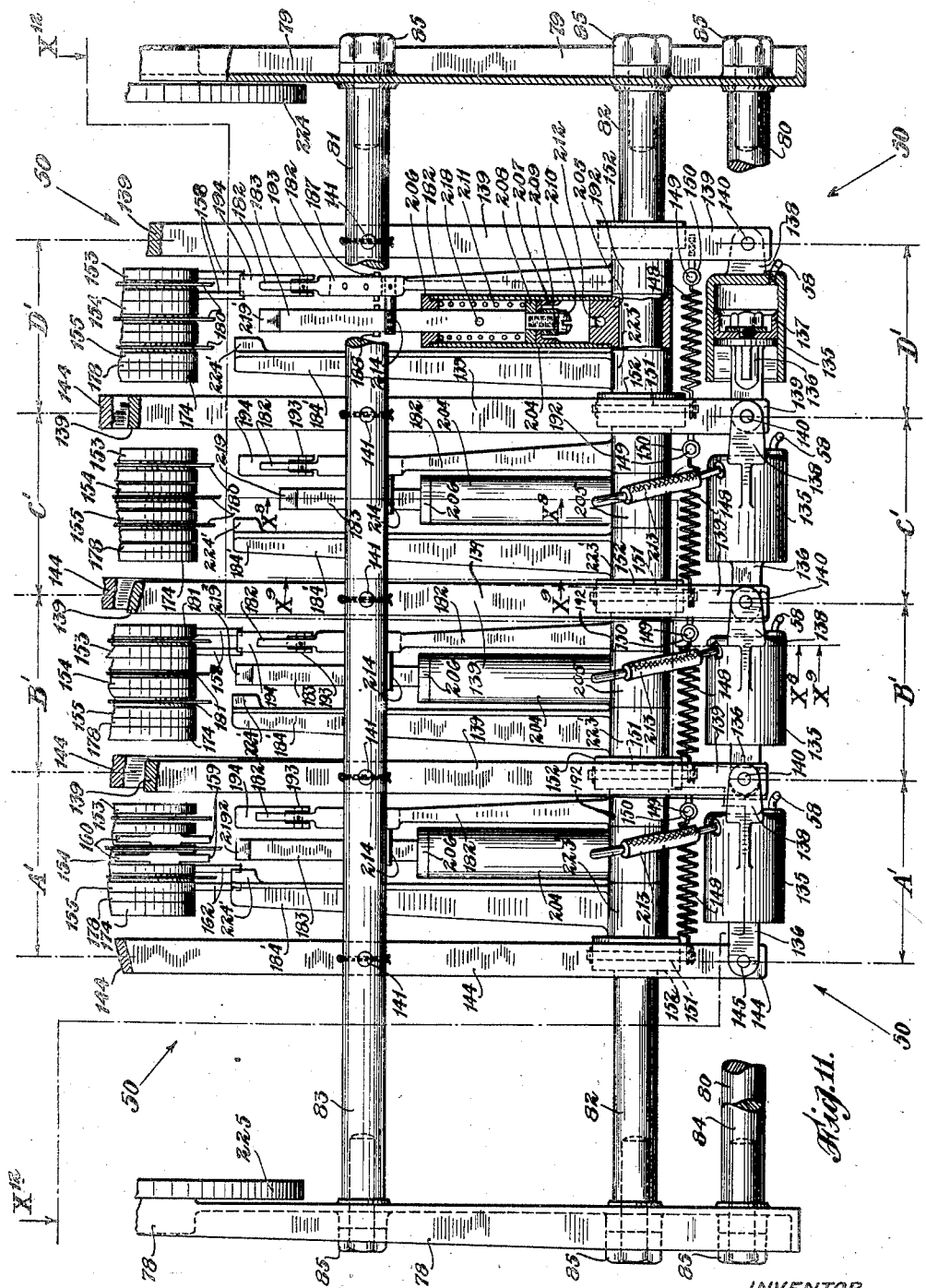

Fig. 7$^a$ is an enlarged sectional view showing the details of an air valve which I use in certain forms of this invention.

Fig. 7$^b$ is a plan section through the upper neck portion of the valve shown in Fig. 7$^a$. This figure illustrates a detail that will be referred to later.

Fig. 8 is a front sectional view of the apparatus illustrated in Fig. 7, and is taken along the broken line $X^8-X^8$ in Figs. 10 and 11.

Fig. 8$^a$ is a fragmental view illustrating a modification which will be referred to later.

Fig. 9 is a front sectional view similar to Fig. 8, but it is taken along the broken line $X^9-X^9$ in Fig. 10, some of the parts being omitted and others being broken away for purposes of increased clearness.

Fig. 10 is a side view of the upper part of the apparatus shown in Fig. 7, some of the parts being shown in section, and some others being omitted or partly broken away for purposes of clearness.

Fig. 10$^a$ diagrammatically illustrates a detail that will be referred to later.

Fig. 11 is a view similar to Fig. 10 but shows the lower part of the apparatus illustrated in Fig. 7.

Fig. 12 is a sectional plan view of the form of apparatus illustrated in Fig. 7, the section being taken along the broken line $X^{12}-X^{12}$ in Fig. 11, some of the parts having been broken away and others omitted for purposes of increased clearness.

By reference to Figs. 1 and 2, the general arrangement of the centrifugal station can best be seen. Fig. 1 shows the mixer tank 1 into which the material to be centrifuged is dumped, this tank usually being of sufficient capacity to hold 50 tons or more. If the character of the material is such as to require stirring in order to preserve its uniformity of mixture, a mixer shaft 2 is furnished, having the stirring blades 3 thereon. This shaft turns slowly under the power of a belt (not shown) running on pulley 4.

Below the tank Fig. 1 shows a group of four centrifugals constituting the so-called mixer group. These centrifugals are respectively designated as A, B, C and D. For simplicity and clearness of illustration these centrifugals are only shown in barest outline in Fig. 1, but Fig. 2, though still only diagrammatic, illustrates the parts of each centrifugal somewhat more fully. The following description, based on Fig. 2, will be understood to apply also to each of the centrifugals shown in Fig. 1 even though many of the detailed parts have been omitted from Fig. 1 for purposes of greater simplicity and clearness.

As far as possible, reference numerals used in Fig. 2 are carried over and applied to each of the four centrifugals in Fig. 1, in order to more clearly point out the corresponding parts in these two figures.

In a general way the centrifugal proper consists of a basket 5 having a foraminous cylindrical wall. This basket revolves with spindle 6 to which it is fastened, and to the upper end of the spindle there is rigidly fastened a pulley or drum 7. This spindle, pulley and basket are rotated by a driving means consisting of the larger pulley 8, Fig. 2, and the quarter twisted belt 9 running under idler pulley 10. When the pulley 8 revolves the centrifugal revolves because of the belt drive which connects them in the manner just described. Through the center of pulley 8 passes the constantly rotating power shaft 11, it being understood, however, that pulley 8 is loose on this shaft and is not rigidly keyed to it. Therefore the power shaft 11, which is in fact the power source or power supply that furnishes the energy that turns the centrifugals, can continue to rotate even though pulley 8 is not rotating. The mechanism by which the centrifugal drive means can be operatively connected and disconnected with the constantly rotating power shaft 11, for the purpose of starting and stopping the centrifugal, will now be described. This mechanism consists in a train of parts starting with clutch 12 which is indicated only diagrammatically in Fig. 2 for the reason that this clutch is a standard mechanism with the various parts of which the trade is thoroughly conversant so that same need not be illustrated in detail here. This clutch is actuated by a pin 13 carried at the lower end of a segment casting 14, the latter being pivotally carried on a pin 15. The upper end of segment 14 has gear teeth 16 which mesh with the teeth on a pinion 17. This pinion 17 is rigidly carried on a shaft 18, and on this shaft there is also mounted a handwheel 19. This handwheel is so located on the centrifugal station as to be easily accessible for the man operating the centrifugal. When he rocks this handwheel 19 one way or the other, the motion is imparted through shaft 18, pinion 17, sector 14 and pin 13 to move the latter back and forth, and this last mentioned motion actuates clutch 12 to frictionally engage or disengage the inner surface of pulley 8. It is in this way that the operator connects or disconnects the loose drive pulley 8 with the power source comprising the constantly rotating power shaft 11 for the purpose of starting and stopping the centrifugal in the successive cycles as will be further referred to later.

As indicated in Fig. 1 the constantly rotating power shaft 11 runs lengthwise of the centrifugal station and behind the centrifugals, and the train of mechanism for driving each centrifugal, and for connecting and disconnecting it with the power source, i. e. with power shaft 11, as described in connection with Fig. 2, is duplicated for each of the four centrifugals shown in Fig. 1 although in the latter figure several parts of the equipment have been omitted for the purpose of preserving simplicity and clearness of illustration in Fig. 1.

The power arangement shown in Fig. 2 constitutes what is commonly known as the standard belt drive, but centrifugals are frequently driven in other ways as for instance, by means of water motors, or by means of electric motors directly connected with centrifugal spindle 6. In the drawings Fig. 4 illustrates what is commonly known as a direct connected electric drive for the centrifugals. In this type of drive the power supply consists in the electric power line 20, instead of the previously described constantly rotating power shaft 11; the driving means consists of electric motor 21, instead of the belt 9 and driving pulley 8 as previously described; and the means for connecting and disconnecting the driving means, i. e., the motor, with the power source, consists of the standard switch box 22 instead of the clutch and train of connected parts previously described in connection with Fig. 2. The switch in box 22 is standard and well known equipment with which the trade is entirely conversant, and for that reason its detailed parts are omitted from the drawings for the purpose of preserving simplicity and clearness. The rocker shaft 23 enters this box, and at one end this shaft is rigidly connected with operating lever 24, and at the other end located in box 22 it is rigidly connected with the switch parts to actuate same, so that when lever 24 is raised to its uppermost position the rocker shaft 23 rotates and causes the switch mechanism in box 22 to establish electric connection between power line 20 and driving motor 21 to drive the centrifugal, whereas when lever 24 is drawn downward, shaft 23 rotates in the other direction, opens the switch mechanism in box 22, and the motor is disconnected from the power supply. Excepting as to details of the drive, all other parts of these direct connected electric driven centrifugals illustrated in Fig. 4, are identical with those shown in Fig. 2, and consequently several of these parts have been omitted from Fig. 4 as same can be seen in Fig. 2. As will be later described, my invention is applicable to all centrifugals whether of the belt or electric driven type, or any other kind of drive, the corresponding or equivalent parts in the various types of drive being easily apparent at least so far as their connection with this invention is concerned.

The weight of the revolving centrifugal parts, i. e. spindle 6, pulley or drum 7, basket 5 and the material charged into same, is carried on the standard centrifugal head 25 located near the top of the spindle, this head being in its turn supported by steel girders which have been omitted from the drawing for simplicity and because they form no part of this invention.

To bring each centrifugal to rest after the power is disconnected a standard brake is provided on all centrifugals. This brake is also common and well known in the trade, and therefore, it is only necessary to indicate it in diagrammatic outline in the drawings. This brake consists of brake shoes 26 adapted to engage the inner surface of pulley or drum 7, Figs. 2 and 4, and these brake shoes are also connected internally to link 27, which at its upper end is connected to hand lever 24. When this lever is drawn downward the brake shoes 26 are pressed outward to engage the inner surface of pulley or drum 7 to bring the centrifugal to rest, and when lever 24 is raised, the brake shoes 26 are disengaged from the pulley or drum and the spindle turns freely.

Around basket 5 is mounted a stationary curbing 28 which collects the liquor that is spun out through the foraminous cylindrical wall of the basket. At the bottom of this curbing there is a drain spout 29 from which the liquor runs onto a movable gutter 30 which is pivotally mounted on pin 30' to direct the liquor from spout 29 either into trough 31 or trough 32 as may be desired. When the gutter is in its full line position shown in Fig. 2, the liquor goes into trough 31, but when this gate is rocked into its dotted line position shown in Fig. 2, the liquor is directed into trough 32.

For the purpose of feeding a charge of material from mixer tank 1 into the centrifugal baskets 5, a chute or spout 33 leads downward from the mixer tank to each centrifugal. At the bottom of this spout there is a charging gate 34, see Fig. 2, which is pivotally mounted on pin 35. When this gate is in its position shown in Fig. 2 it closes the lower end of spout 33 so that no material can pass out of same, but when the operator raises this gate by means of handle 36, the gate rocks upward around pivot 35 to uncover the mouth of the spout and the material flows downward through the spout from mixer tank 1 into basket 5, the gate 34 being again closed when a sufficient charge of material has been loaded into the basket. Since gate 34 is heavy, it has been balanced by a counterweight portion 37 cast integrally with gate portion 34 but on the opposite side of pivot 35, which permits the man to operate the gate quite easily.

In connection with the centrifugal equipment described in the preceding paragraph, it is common practice to use some form of washing equipment for the purpose of washing the material in the basket after as much of the original liquor has been spun out of this material as possible. Various forms of manually operated washing equipment have been in use for a long time, but since the washing equipment used in this present invention is new and is associated in a special manner with the centrifugal control apparatus to be described later, I will not describe this washing equipment at this point in the specification, except to say generally that I use washing equipment in connection with the automatic control apparatus to be described later. In fact, the improvements effected by this invention over previous forms of washing equipment constitute a very important and valuable part of this invention, especially as concerns the collective adjusting of this washing means, but as indicated, same will be described later in connection with the description of the entire control apparatus.

As previously mentioned, all the equipment thus far described in this application excepting the washing equipment is well known machinery which is in common and extensive use today, and with which the trade is entirely conversant, for which reason it has been illustrated only diagrammatically in the drawings, the structural details having in all cases been omitted for purposes of clearness.

In order that the connection and manner of co-action between this previously described standard equipment and my fully centralized automatic control equipment to be described later, can be more clearly understood, I will first describe briefly the usual manual mode of operating this standard centrifugal equipment.

As any of the centrifugals A, B, C, or D in the mixer group reaches the end of its cycle, the operator for that centrifugal discharges the centrifuged material therefrom in readiness for the next cycle. He then starts the centrifugal on its next cycle by first charging the same, which he does by raising charging gate 34 by means of lever 36. This permits material to flow from mixer tank 1 down through spout 33 into basket 5 of that centrifugal, until a sufficient charge is introduced, at which moment the operator lowers the lever 36 to close charging gate 34, which obviously cuts off the flow of material into basket 5. After this, or during the charging operation, the operator starts the centrifugal turning. This is accomplished in the belt driven centrifugal shown in the Fig. 2, by turning hand wheel 19 in the correct direction to operatively connect clutch 12 with driving pulley 8, which as previously described causes the centrifugal to turn because of the power transmitted to it from the power shaft 11. With the direct connected electric driven centrifugals shown in Fig. 4, the same result is obtained by raising the lever 24 to its uppermost position, which as previously described turns the power onto the driving motor 21, and the centrifugal starts to rotate with the motor. In both cases the centrifugal soon reaches full speed, and the free liquor portion of the material charged into the basket gradually spins out through the foraminous cylindrical wall of same, but the solid portions of the material remain in the basket as the openings in the cylindrical wall of same are too fine for the solid portions to pass through. The liquor thus spun out of the basket is caught on the inner surface of curbing 28, from which it drains down through spout 29 onto liquor gutter 30, and thence into the original liquor trough 31. The spinning proceeds in this manner for a definite time, presumably until all of the free original liquor has been spun out of the basket. The length of this original spinning period is instinctively measured by the operator by means of his ordinary human faculties for measuring or judging time, and at the end of this period as judged or measured by the operator, he starts up the washing action previously referred to. That is with whatever washing equipment he has he applies a definite measured amount of water or other washing fluid to the material in the rapidly revolving basket 5. This washing fluid of course passes out through the material and through the foraminous cylindrical wall of the basket in the same manner that the original liquor passed through, and it is likewise collected by the curbing 28. For various reasons it is often, but not always, desirable and necessary to collect this wash liquor separately from the original liquor. When such separation is to be made, it is procured by shifting the movable gutter 30 back and forth between the two troughs 31 and 32. For instance, at the beginning of the cycle the operator shifts this gutter 30 into its full line position shown in Fig. 2, and leaves it there all during the period of original spinning, i. e. prior to the application of the wash fluid, and therefore the original liquor spinning out of the basket obviously drains into the original liquor trough 31. However, when the washing action commences, or shortly thereafter, the operator shifts gutter 30 into its dotted line position shown in Fig. 2, and therefore the wash liquor which thereafter drains down from the curbing obviously passes into the wash liquor trough 32. It is in this manner that the separation is effected between the original and the wash liquor, but of course if no such separation is desired, the gutter 30 is never shifted but drains all the liquor into one trough only. During the entire washing operation the centrifugal continues to rotate at full speed, and this continues for a given period after the washing action ceases, this latter period being sometimes referred to as the drying period for the reason that it serves to dry the material to the desired degree and also to spin out the last traces of the washing liquor. The duration or length of this drying period is also instinctively measured by the operator by means of his ordinary human faculties for measuring time, and at the end of this period as judged or measured by the operator, he stops the centrifugal by cutting off the power and subsequently applying the brake. He does this with the belt driven centrifugal shown in Fig. 2 by turning handwheel 19 in the correct direction, which disconnects the clutch from the power shaft 11, and he thereafter applies the brake by drawing brake lever 24 downward, after which the centrifugal presently comes to rest. With the direct connected electric driven centrifugal shown in Fig. 4, the operator accomplishes the same result by merely drawing lever 24 from its uppermost to its lowermost position, which simultaneously disconnects the driving motor from the power supply line 20, and also sets the brake through the agency of link 27 as previously described. After the centrifugal of either the belt or electric driven type, or any other type, is brought to rest the operator discharges the material therefrom usually by means of a mechanical discharging apparatus not shown in the drawings for the reason that same has no direct co-action with this invention, and for the further reason that such discharging apparatus is common and well known in the industries using centrifugal apparatus. When the material is discharged from the basket the centrifugal is ready to operate on the next charge. The operator therefore throws gutter 30 back to the original liquor trough 31, then takes a new charge of material into the basket by opening the charging gate 34, and the previously described operations are repeated for cycle after cycle, not only in one centrifugal but in all the centrifugals in the group, until all the material in mixer tank 1 has been centrifuged through the machines. It is important to notice that all the centrifugals A, B, C, and D operate entirely independently of each other, at least in one sense. That is, any one centrifugal can be started separately and irrespective of the other centrifugals. Likewise, each of the successive steps in the cycle, to wit: starting the washing action, throwing the liquor gutter, and stopping the centrifugal, together with other steps in the cycle if there are any, are all performed independently as between the different centrifugals, or in other words the centrifugals are operated in independent time relation to each other in the sense just described. This kind of independence of the centrifugals one from the other, is important in order that economy of labor, power, etc., can be preserved in the operation of the station. In another sense however, there are important relations between the various centrifugals in the mixer group, requiring that these centrifugals operate as uniformly as possible between themselves. That is, as nearly as is possible or feasible, the time intervals separating from each other the successive steps of the cycle in one centrifugal, should be alike for all the centrifugals, so that the material will be uniformly centrifuged regardless of which particular centrifugal it came through. Where uniformity of the final material is necessary, the importance of this condition is obvious, because if the various centrifugals do not operate uniformly on the material its state or condition as discharged from the several machines will not be uniform, and this of course is not desirable.

In this connection it will be noticed that in the ordinary manual mode of operating the centrifugals, as above described, the timing of the above mentioned steps in each centrifugal is performed only through the instincts of the men, the use of ordinary watches, clocks or other time pieces for this purpose, being impractical, and since the instincts of the operators are not entirely dependable in the measurement of time, and also since they differ somewhat between the operators of different centrifugals, it follows that the above described manual mode of operating the centrifugals does not insure entirely uniform timing of the various centrifugal operations, and this condition is rather undesirable for reasons above mentioned.

It is for the purpose of correcting these irregularities of manual operation, and also for the purpose of saving labor and making the work easier for the men, that I have developed the automatic control ideas constituting this invention, and particularly the new basic improvements comprising the fully centralized mixer type control which through its collective adjustments for all the centrifugals, provides accuracy and convenience in making the adjustments, and also permits certain structural simplifications, and gives other benefits.

As mentioned, one of the basic features of this invention is that it permits this collective changing of any of the above described time intervals, or of the amount of washing fluid, practically simultaneously for all the centrifugals, and achieves this by a comparatively simple operation, this general improvement being an important advance over the ordinary individual controls which require that the various adjustments must all be individually made at each and every centrifugal, which of course is more laborious and inaccurate than my collective adjustment and control.

It will be understood that the technical operating condition on which my collective control and adjustment depends, and which makes the same especially advantageous and proper, is as follows: At any instant the material in the mixer tank 1 is practically uniform throughout, and therefore the material being fed from this tank to all the centrifugals in the group is also uniform. This therefore requires that all the centrifugals should operate uniformly on this material, i. e., according to a uniform time cycle, which is adjusted to best suit that material, all to the end that the resulting product as discharged from the various centrifugals should also be uniform and of the best possible grade. As the operation of the station proceeds, however, the character of the material in tank 1 gradually changes due to settling or cooling in the mixer tank, or to other causes, and also when one batch of material is completely worked out of the mixer tank, and a new batch is dumped in, it often happens that the new batch is different from the former batch. All these changes in the character of the material of course require corresponding changes in the centrifugal cycle so that the centrifuging operation will at all times best suit the condition of the material. It will be obvious, however, that whenever such a change is required, it will be uniformly required as to all the centrifugals in the mixer group, and consequently it is technically advantageous and proper, apart from the increased ease, simplification, etc., to collectively change or adjust all the centrifugals at once as I am now proposing to do, instead of individually adjusting them as was previously the custom.

The mechanism embracing the broad conception of this invention, including the collective changing of the amount of washing fluid, can of course be arranged in a great many different ways, and for the purpose of transmitting to the various centrifugals the control impulses set up or released by my automatic equipment, various forces can be used including electricity, water pressure, oil pressure, air pressure, direct mechanical action, etc., all depending upon the desires of the designer and user of this equipment, and the form and nature of the parts constituting the equipment will of course be different according to which of these forces is utilized. In the particular embodiment of this invention which I have elected to illustrate in this application, I have selected compressed air for transmitting the control impulses, as will be subsequently described.

Although any form of apparatus which broadly permits the above described collective or simultaneous changing of the cycle characteristics for all the centrifugals in the mixer group, including the flexibility between the adjustments, comes within the broad spirit of my invention, nevertheless, in the embodiment of the invention which I have illustrated in this application, I have elected to show a form of the apparatus which embraces the further idea of using more or less separate sets of control parts, one set for each centrifugal, the several parts in the several sets being so organized as to permit the collective adjustments previously referred to.

Also by referring to this invention as a fully centralized control, I refer chiefly to the fact that the adjustments are centralized so as to permit the collective adjusting of all the centrifugals as previously mentioned. So long as this important feature is realized, it is within the scope of my invention to permit the various sets of the control parts to be spread out along the centrifugal station if the designer and user of this equipment so prefer, but for myself, I prefer to arrange the control apparatus in a compact, concentrated device which can then be located away from the centrifugals, thereby sparing it from the vibrations, corrosion and other hurtful conditions which are continually present right at the centrifugals, and also I can place such a compact, concentrated device at a location that is clean, light, readily accessible, and entirely safe from the danger of the high speed centrifugal machinery, which is important from the standpoint of the safety and durability of the equipment and keeping it in good condition. Also, it permits the station foreman to make the above mentioned adjustments conveniently and very quickly, and the foreman is thereby encouraged to pay greater attention to the adjustments, all of which results in keeping the centrifugals in more perfect step with the changing requirements of the material than is ordinarily realized with individual centrifugal controls because of the laborious nature of individually changing the latter.

In Figs. 1 and 2 my fully centralized control device is diagrammatically indicated by reference numeral 50, and from this device there runs out several pipes or tubes to each centrifugal for transmitting back and forth the compressed air impulses previously referred to, and also for transmitting the washing fluid which is measured for each centrifugal in a manner that will subsequently be described.

Before describing the details of the control machine 50 itself, it will be helpful to describe certain members located at each centrifugal for the purpose of there utilizing the compressed air impulses which the control machine releases or supplies at the correct moments in the cycle for controlling the centrifugal.

These parts are best illustrated in Figs. 1 and 2 and comprise principally cylinders 52 and 53 which cooperate in stopping the centrifugal. Cylinder 52 disconnects the power and cylinder 53 applies the brake. Each of these cylinders has a movable air-tight piston and piston rod respectively designated for the different cylinders by reference numerals 52′ and 53′; and likewise each of these cylinders is pivotally mounted on a pin respectively designated as $52^2$ and $53^2$, these pins in their turn being supported by suitable steel structure which has been omitted from the drawings for the purpose of clearness. In regard to the power cutoff cylinder 52, it is noticed that the piston 52' of same is connected to a crank 52³ which is rigidly fastened to shaft 18, so that when compressed air is admitted behind the piston in cylinder 52, the force of same acts through crank 52³ to turn shaft 18 the same as the hand of the operator previously turned this shaft by means of handwheel 19. The direction of this thrust is so arranged that the clutch disengages the centrifugal drive means from the power shaft 11, thereby disconnecting the centrifugal from the power supply when the compressed air is admitted to cylinder 52. In regard to the brake cylinder 53 it is noticed that its piston 53' is connected to the brake lever 24, so that when compressed air is admitted behind the piston 53 it pushes lever 24 downward to apply the brake the same as the hand of the operator ordinarily does when the centrifugals are only manually controlled. In the belt driven centrifugal shown in Fig. 2 it is also noticed that the compressed air is admitted to the top of cylinder 53 by means of a flexible tubing connection 54 which leads from the lower part of cylinder 52. The purpose of this is that no compressed air can enter cylinder 53 until the piston 52' in cylinder 52 has reached practically the lowermost point in its stroke, at which time crank 52³ and shaft 18 would have already been actuated to disconnect the power before the compressed air from cylinder 52 can be by-passed through tube 54 to the brake cylinder 53 to apply the brake. This arrangement insures that the power will be disconnected before the brake is applied, which saves the belt and transmission equipment from the undesirable possibility of occasionally having the brake applied before the power is disconnected. In the electric driven type of centrifugal shown in Fig. 4, the single cylinder 55 having the piston 55' connected with the control lever 24, takes the place of the two cylinders 52 and 53 in the belt driven centrifugal shown in Fig. 2. This one cylinder 55 performs the double function of disconnecting the power in switch-box 22 and of applying the brake blocks 26, because these two functions are interlocked to control lever 24 in this electric driven centrifugal, as has been previously described.

It is with the aid of cylinders 52 and 53 in the belt driven centrifugals, and cylinder 55 in the electric driven centrifugals, that the automatic control equipment stops the centrifugals, by which term I mean the cutting off of the power or the applying of the brake, as the subsequent braking period while the centrifugal is slowing down and coming to rest is ordinarily not considered as a part of the spinning period.

At each centrifugal my invention contemplates that there should be located some sort of means for placing that centrifugal under the influence of the control machine at any desired moment for the purpose of allowing the control machine to measure time and lead that centrifugal through its spinning cycle, including the washing, and stopping and other steps of the cycle, if any. The nature of this means of course depends on the kind of force used for transmitting the impulse to the control machine 50, i. e., whether electricity, water pressure, oil pressure, air pressure or other force is used for this purpose. In this particular embodiment of the invention I have elected to use air pressure for performing this function, and accordingly I employ at each centrifugal a three-way valve 56, see Figs. 1, 1ª, 2 and 3. Fig. 1ª shows this valve arranged for automatic operation in connection with the previously described shaft 18, as will be more fully referred to later, while the other figures show this valve arranged for hand operation. In regard to this valve Figs. 2 and 3 should be read together. One of the ports 56' of this valve is connected to the compressed air supply line 57. Another of the ports 56² of this valve is connected to engaging mechanism (to be subsequently described) on the control machine 50, by means of tubular connections 58; and the last of the ports 56³ of this valve exhausts into the atmosphere. This valve is conveniently located at each centrifugal so that the operator can reach it easily. When the valve control handle 59 is in its full line position shown in Fig. 3, it is apparent that compressed air is admitted from the air line 57 through the valve and through tubular connection 58 to the control machine 50, where it places the centrifugal under the influence of the control machine in a manner that will be presently described; and when the valve handle 59 is turned 90 degrees in the direction of arrow "a" Fig. 3, communication is opened between tube 58 and exhaust port 56³, so that the compressed air in tube 58 is exhausted to release the centrifugal from the automatic control mechanism as will be presently described.

As has been previously indicated, the control equipment does at the proper moment supply to each centrifugal a measured quantity of washing fluid, and for the purpose of correctly distributing this fluid over the material in the basket, a nozzle is employed at each centrifugal. So far as this invention is concerned, any distributing nozzle whatsoever is sufficient, so long as it suits the requirements of the user. In centrifugals C and D, Fig. 1 I have shown a form of nozzle that is in common use. It is indicated by the reference numeral 60. It is mounted in a stationary position and is adapted to distribute the water in a more or less fan-shaped jet or spray as indicated, so as to apply the washing fluid over the entire height of the basket at once. The washing fluid is supplied to this nozzle by means of pipes 61 as shown. In connection with centrifugals A and B, Fig. 1, and in connection with the centrifugal shown in Fig. 2, I have indicated a more efficient means of distributing the washing fluid over the basket. The details of this means are best illustrated in Fig. 2 although same is also shown in connection with centrifugals A and B, Fig. 1. In a general way this means may be described as being a simple oscillator, having a nozzle 62 adapted to discharge the washing fluid in a comparatively concentrated jet indicated by the line 63, Fig. 2. This jet of course may consist of several fine streams which are substantially parallel to each other. The characteristic feature of this washing arrangement is that the nozzle 62 is oscillated up and down with a proper movement, so that the jet 63 will sweep between its upper and lower limits respectively indicated at 64 and 65 of Fig. 2, thereby covering the entire height of the basket as indicated. The nozzle 62 is located at the end of a nozzle arm 66 best seen in Figs. 2 and 6. At its rear end this nozzle arm is connected by means of flexible hose 67 to its fluid supply pipe 61. For the purpose of oscillating this nozzle arm so as to sweep the spray up and down between the limits 64 and 65 Fig. 2, this arm is fastened to the rocker shaft 68 by means of set screw 69, Fig. 6. To shaft 68 there is rigidly fastened the arm 70, Fig. 2, carrying the roller 71. This roller runs on a constantly rotating cam 72 driven by worm gear 73 which meshes with worm 74 carried on vertical shaft 75. To the top of this shaft is fastened pulley 76 which is driven from the centrifugal spindle 6 by means of belt 77. With this arrangement it will be seen that when the centrifugal turns, the nozzle 62 will oscillate up and down under the action of cam 72, and the washing fluid will be correctly distributed over the revolving basket by reason of cam 72. The nature of this distribution, and the benefits to be derived therefrom, are fully described and broadly covered by the United States Patent No. 1,423,583 granted to me on July 25, 1922, and entitled Method of and means for washing centrifugals, to which reference should be made for further description of same. The oscillating distributor shown in Fig. 2, however, has no provision for measuring the quantity of wash fluid supplied through it, as this measuring is now done in connection with the control equipment.

Turning now to the details of the automatic control machine 50 itself, it will be seen that these details are best illustrated in Figs. 7 to 12 inclusive.

In order to permit the control apparatus to be assembled into a compact and concentrated machine, a frame or supporting structure is provided comprising primarily the two more or less identical end castings 78 and 79 seen in Figs. 7, 8, 9, 10, 11 and 12, these end castings being securely and rigidly fastened to each other in correct space relation by means of rods 80, 81, 82, 83 and 84, all of which extend the entire distance between the end castings, and all of which are securely fastened to these end castings by means of cap screws 85 as shown in the various figures. In addition to the rods, the end castings are also fastened to each other by means of the bars or platforms 86 and 87, the same being fastened to the said castings by means of the cap screws 88 as best indicated in Fig. 12 aided by Figs. 7, 8 and 9.

The bar 86 may be referred to as a valve platform because it supports a series of wash fluid valves 89, one for each centrifugal, and also a series of control valves 90, one for each centrifugal, this being best indicated in Fig. 12 aided by Figs. 7, 8 and 9. Obviously there are four of these wash fluid valves 89, and four of the control valves 90, for the reason that there are four centrifugals, A, B, C and D, comprising the particular mixer group illustrated in Fig. 1, but it will of course be understood that the mixer group may consist of a number of centrifugals larger or smaller than four—in fact any desired number of centrifugals may be arranged to comprise the mixer group—and according to the number of centrifugals there will be a corresponding number of wash fluid valves 89 and control valves 90 on the valve platform 86.

A typical cross section through any of the wash fluid valves 89 is shown in Fig. 8. In this figure the valve body 91 is seen to have an inlet opening 92 and an outlet opening 93 with a valve seat 94 between these openings. Against this valve seat lies the packer 95 carried on the stem 96, the latter being guided at its lower end by post 97 rising from the valve cap 98, and the stem 96 being pressed upward to normally hold packer 95 closed against valve seat 94 by means of spring 99. Packer 95 is fastened to stem 96 by means of screw 100. At the upper part of the valve there is a gland 101 through which passes stem 102 the lower end of which is adapted to butt against screw 100, and when sufficient force is applied downwardly to stem 102, the valve is obviously opened by forcing packer 95 down and away from valve seat 94, and when this downward force on stem 102 is removed the valve instantly closes under the action of spring 99 which is sufficiently strong for this purpose. For the purpose of effecting an adjustment that will be subsequently referred to, the upper end of stem 102 is threaded as indicated at 103, and a hexagon adjusting nut 104 and check nut 105 is carried on this threaded stem. For the purpose of supplying the washing fluid to the several valves 89, there is provided a large header 106, see Figs. 7, 8, 9 and 12, and from this header there is a branch 107 leading into and connecting with the inlet opening 92 of each of the valves 89, the manner of this connection being obvious from the drawings. From the outlet opening 93 of each of the valves 89 there runs a pipe 61. Consequently in a machine for controlling four centrifugals there will come four such pipes 61 corresponding to the four wash fluid valves 89, and each of these pipes will respectively lead to one of the centrifugals. This relationship is illustrated in Fig. 1 showing the four pipes 61, of which one is connected with each of the nozzles at the centrifugals A, B, C and D. Therefore when one of the wash fluid valves 89 is opened, the washing fluid immediately commences to spray upon the material in its connected centrifugal, and likewise when the wash fluid valve is subsequently closed the application of the washing fluid to that centrifugal immediately ceases. The means for automatically opening and closing these wash fluid valves 89, will be subsequently described. In concluding this description of the wash fluid valve, it will be noticed from Fig. 12 that each of these valves is fastened to the platform 86 by means of two bolts or cap screws 108. Also, it will be understood that the washing fluid is supplied to header 106 under a constant pressure, the source of this pressure not being shown in the drawings.

A typical cross section through any of the control valves 90 is best shown in Fig. 7 and in the enlarged view 7ª. The control valve itself consists of a cylindrical body portion 110 having a hole drilled axially therethrough, and having its upper exterior portion turned down to form a shoulder 111, and terminating in the upper threaded neck portion 112. In the axial hole passing through the valve body, there is formed an upwardly facing valve seat 113, and also a downwardly facing valve seat 114. In this valve body there is a movable stem comprising an upper portion 115 and a lower portion 116. The upper portion 115 has a downwardly directed valve face 117 adapted to co-act with seat 113 to open and close the valve at that place. Likewise the lower stem portion 116 has an upwardly directed valve face 118 adapted to co-act with seat 114 to open and close the valve at that place. The lower stem portion 116 terminates at its upper end in a reduced rod portion 119, which is threaded at its upper extremity and screws into the upper stem portion 115 as indicated in Fig. 7ª. By means of this screw connection the distance between the upper and lower stem portions 115 and 116 is adjusted, until the distance between the valve faces 117 and 118 is slightly larger than the distance between valve seats 113 and 114. This permits the valve stem to have a little vertical movement within the valve body, the valve being closed at seat 113 when the stem is in its lowest position, and being closed at seat 114 when the stem is in its uppermost position. Compressed air is supplied to this valve through the upper part 120 of the axial hole. When the valve stem is in its uppermost position, the valve is open at seat 113 and closed at seat 114, and in this position the compressed air passes down from the valve inlet 120 and out through the valve outlet opening 121, from which it passes through pipes that will be presently described, to the power and brake control cylinders 52 and 53 of the belt driven centrifugal, or to the single cylinder 55 of the electric driven centrifugal shown in Fig. 5. If the stem thereafter drops to its lowermost position, which is the position shown in Fig. 7ª, the valve will be closed at seat 113 and open at seat 114, in which position the compressed air supply is cut off from inlet opening 120, and the charge of compressed air in the power control cylinders and intervening piping will exhaust itself by passing back through valve opening 121, down past seat 114, and out through the exhaust openings 122. The upper guiding part 123 of the valve stem, is not cylindrical and therefore does not fill up the entire hole in which it rides. On the contrary, it is formed with flat faces 124 as shown in Fig. 7ᵇ. It is through the space left between these flat faces and the round contour of the hole that the air passes downward through the inlet opening 120 of the valve, around the stem portion 115 and out past valve seat 113 when the valve is open at this place. Into the lower end of stem portion 116 as best seen in Fig. 7, there is threaded a screw 125 having two washers 126 between which operates the end of a control lever which will be described later. As previously stated there is one of these control valves for each centrifugal, and from the outlet opening 121 of each of these valves there runs a tube 127 to the power control cylinder of the centrifugal corresponding to that valve. This is best seen in Fig. 7, read in connection with Fig. 1, the latter showing all four pipes 127 leading from the four control valves on the automatic control machine 50 to the respective power control cylinders 52 located at the four centrifugals. From the foregoing description it will now be apparent that if the centrifugals are spinning and it is desired to stop any one of them, it is merely necessary to lift the valve stem 116 of the control valve corresponding to that centrifugal. This releases the compressed air to the power and brake cylinders of that centrifugal and when the power is cut off and brake applied, the centrifugal is stopped and presently comes to rest. The means for automatically lifting stem 116 of any of the control valves will be described later. For the purpose of supplying the compressed air to all of the control valves, a suitable air header 128 is provided as best seen in Figs. 7, 8, 9 and 12. As will be readily understood, especially in connection with Figs. 7 and 12, this header is provided with a downwardly directed branch 129 leading down to each of the control valves as best illustrated in Fig. 7. The lower end of each of these branches is flanged as shown at 130, and a packer 131 is inserted between this flange and the upper threaded neck portion 112 of the valve. The nut 132 effects an airtight connection between the valve and its header branch 129 by squeezing these parts together, and the nut 133 securely fastens the valve to platform 86, these various nuts, etc., of course being duplicated at the various valves. The compressed air enters the end of header 128 from a source not shown, and in an obvious way is supplied from this header to each of the control valves through their respective branches 129.

At this point in the description I desire to now call attention to the fact that in Figs. 10, 11 and 12, and also in the diagrammatic views, Figs. 1 and 2, I have endeavored by certain indicating lines, to divide the automatic control machine 50 into approximately four equal areas designated by the reference characters A', B', C' and D'. If it be assumed that these indicating lines are prolonged or extended across the entire drawing, it will be noticed that they mark out four sets of parts, each set being practically a duplicate of the other sets. These in fact represent the sets of control parts previously referred to for controlling the centrifugals, there being one set for each centrifugal, and the set indicated within the limits A' being adapted to control centrifugal A, while the other sets respectively indicated within the limits B', C' and D', each control the corresponding centrifugals, B, C and D as best indicated in Fig. 1 read in connection with the other figures. Of course if there are more than four centrifugals in the mixer group, there will be additional sets of control parts for controlling them, the end castings 78 and 79 of the control machine being simply spaced further apart to receive the additional sets of parts, and likewise if there are less than four centrifugals in the mixer group their corresponding sets of control parts will be omitted and the end castings 78 and 79 will be brought closer together to keep the control machine as compact as possible.

It will be understood that regardless of whether the automatic equipment having my features of collective adjustments previously referred to, does or does not use this further feature of employing more or less separate sets of control parts for the separate centrifugals, the nature, shape and construction of the individual parts will of course differ somewhat according as to whether electricity, air pressure or other force is used for transmitting the control impulses from the control machine to the various centrifugals; and even when the same force is used these parts may differ extensively without departing from the broad spirit of this invention. However in the particular embodiment of the invention disclosed herein I use this feature of sets of control parts for controlling the various centrifugals, and in connection therewith I use compressed air for transmitting the control impulses back and forth between the control machine 50 and the various centrifugals.

Turning now to a more detailed description of the above mentioned sets of control parts, the following description of one of them will be found to apply to all of the sets as they are practically duplicates of each other, and in making this description of one set, I will use like reference numerals to indicate like parts in the different sets.

In a general way each of these sets of control parts, in this particular embodiment of my invention, may be said to comprise the following sub-mechanisms, to wit: first, engaging and disengaging mechanism, and second, traveling mechanism adapted to measure time by the amount of its movement or travel and also adapted to accomplish the previously described cycle steps for their centrifugals in correct time sequence. The parts mentioned in this paragraph are in addition to those previously described.

I will now describe in detail each of the general mechanisms or sub-combinations mentioned in the preceding paragraph.

The purpose of the engaging and disengaging mechanism is to permit each centrifugal to be independently placed under the influence of its set of control parts for leading the centrifugal automatically through its time cycle and for disengaging the centrifugal from the control at the end of the cycle to permit the control parts to reset themselves to their initial position in readiness for the next cycle. This engaging mechanism operates in conjunction with the previously described valves 56 located at the several centrifugals as indicated in Fig. 1. Each of these valves, it will be noted, is connected to the control machine by a tube 58 and this tube enters an engaging cylinder 135 corresponding to its set of control parts, the connection between the tube 58 and the cylinder 135 being best seen in Fig. 11. Cylinder 135 has a plunger 136 preferably equipped with a pneumatic cup leather 137 as best indicated in the sectional views of this cylinder found within the control sets A' of Fig. 12 and D' of Fig. 11. At the head end of cylinder 135 the casting is forked as best seen in the control set A', Fig. 12, and the prongs 138 of this fork are connected to lever bars 139 by means of pins 140 driven into these bars. These lever bars may be square in section as shown, and they extend up vertically from cylinders 135 as best indicated in Figs. 8, 10, 11 and 12. The fulcrum of these levers is carried part way up along their length, and consists of a pin 141 carried by and between the horizontal rods 81 and 83 which connect the end castings 78 and 79 as previously described, the location of pins 141 for the various sets of control parts being best indicated in Figs. 10, 11 and 12 in connection with Figs. 7 and 8. At their upper extremities the lever rods 139 are notched out as best shown in Fig. 8 for the purpose of receiving a ball-bearing roller 142, the latter turning freely on pins 143. The location and appearance of these rollers is also illustrated in Fig. 10 and their purpose will be more fully described later on. As is best illustrated in set A' of Fig. 12, the plunger 136 of engaging cylinder 135, is connected at its outer end to the square lever bars 144 by means of pin 145. Except that they are located closer to the center line of cylinder 135, these lever bars 144 are identical in structure, mounting, etc., with the previously described lever bars 139. Bars 144 are also carried on the fulcrum pins 141 between the previously described rods 81 and 83, and at their upper extremities the lever bars 144 are equipped with rollers 146 running on pins 147, these details corresponding with the previously described rollers 142 and pins 143 of lever bars 139. In addition to Fig. 12, the lever bars 144 are clearly indicated in Figs. 8, 10 and 11. From the foregoing description of this engaging mechanism it is apparent that when any of the valves 56 are thrown into the position indicated for centrifugal A in Fig. 1, compressed air is transmitted through its tube 58 to engaging cylinder 135, and the force of the latter is transmitted at its head end to the two lever bars 139, while its force at the plunger end is transmitted to the two lever bars 144. As viewed in Figs. 10 and 11 this would cause lever bars 139 to rotate counterclockwise around fulcrum pin 141, and would cause lever bars 144 to rotate clockwise around fulcrum pin 141, thereby clamping between the two rollers 142 of bars 139 and the two rollers 146 of bars 144 certain timing or traveling members to be described later. When valve 56 is thrown into its release position as shown in the valve of centrifugal C in Fig. 1, the compressed air is released from its corresponding engaging cylinder 135 at the control machine 50, and the plunger 136 and cylinder 135 tend to retrieve into each other under the action of spring 148 best illustrated in Figs. 7 and 11, and also in control set B' of Fig. 12. At one end this spring is connected to pin 149 which is carried between the screw eyes 150 fastened into lever bars 139, as indicated in set B', Fig. 12. The other end of spring 148 is fastened to the lower end of a pin 151 passing down through spacing collar 152 mounted on the horizontal rod 82 that extends between the two end castings 78 and 79, as previously described. In fact, this pin 151 fastens or keys the collar 152 to its position on shaft 82. This connection between spring 148 and pin 151 is best seen in Figs. 7, 8, 9 and 11. From this description it is apparent that when the compressed air is released from cylinder 135, spring 148 draws the lever bars 139 in the opposite direction from that in which they were pushed when the compressed air was admitted to cylinder 135, and this retrieving action set up by spring 148 unclamps the timing members from between the rollers 142 and 146 at the upper ends of lever bars 139 and 144. This clamping and unclamping of the timing members from between these rollers will be referred to later on after additional parts of control machine 50 have been described.

I will now describe the particular form of traveling or timing mechanism which I have adapted in this form of my invention for the purpose of measuring time, it being understood that this mechanism is shown duplicated in the drawings for each of the various sets of control parts on machine 50. In this particular embodiment of the invention, I have illustrated the traveling mechanism as comprising a plurality of rotatable members mounted to rotate about a common axis, but in other forms of this invention the nature, shape, mounting, mode of actuating, and character of motion used by the traveling mechanism can be quite different. For instance even if rotatable members are used they need not rotate about a common axis, and instead of using a rotary motion the traveling mechanism may employ a straight line motion, or other character of motion, and in certain modifications of my invention a single traveling member can be employed instead of a plurality thereof, all these differences, as well as others, being compensated for by other differences in other parts of the construction.

However in the particular embodiment of my invention as illustrated in the accompanying drawings, the traveling mechanism previously referred to comprises a series of rotatably mounted disc shaped members 153, 154 and 155, see Fig. 10, there being one such series of members for each of the previously described sets of control parts A', B', C' and D'. As indicated in Fig. 10 all these discs for all the sets of control parts have a common axis, and the center of a supporting shaft 156 is also located in this common axis so that all of said discs for the various sets of control parts are concentrically mounted with reference to shaft 156. All of the discs 153, 154 and 155, are loosely mounted with respect to each other and with respect to shaft 156, so that they can rotate independently of each other, and independently of shaft 156. The outer periphery of each of these discs is arranged with two lugs, one of which may be termed a stop lug, and the other an operating lug. These lugs can be best seen in Fig. 8 read in connection with Fig. 10. Reference numerals 157 and 158, Fig. 8, are respectively attached to the stop lug and operating lug of a disc 153; reference numerals 159 and 160 are similarly attached to the stop lug and operating lug of a disc 154; and reference numerals 161 and 162 are similarly attached to the stop lug and operating lug of a disc 155. It will be noticed from Fig. 8 that the distance between lugs 157 and 158 of a disc 153 is smaller than the distance between lugs 159 and 160 of a disc 154, and likewise that the latter distance is less than the distance between lugs 161 and 162 of a disc 155. The purpose of this difference will become apparent later, but for the present suffice it to say that this is the only difference between any of the discs 153, 154, and 155 as the same are identical in all other respects. In addition to this it may be stated that all the discs 153 in all the sets of control parts A', B', C' and D' are absolutely identical with each other including the distance between their stop lugs and operating lugs, and likewise all the discs 154 are absolutely identical with each other, and all the discs 155 are absolutely identical with each other in the sets of control parts A', B', C', and D'. In a manner that will be hereinafter described the three discs 153, 154, and 155, of any of the sets of control parts, can be engaged to rotate about their common axis for the purpose of measuring time, the direction of this motion being counter-clockwise as viewed in Fig. 8, and during this timing movement it is the function of the operating lug 158 of disc 153 to open the wash fluid valve 89 corresponding to its set of control parts, and likewise it is the function of operating lug 160 of disc 154 to subsequently close this wash fluid valve, and it is the function of the operating lug 162 of disc 155 to subsequently stop the centrifugal corresponding to its set of control parts, the description of precisely how these lugs accomplish these respective functions being given later. After the centrifugal cycle is finished, this series of discs 153, 154, and 155 can be retrieved in a manner that will be hereinafter described, the direction of their retrieving motion around their common axis being clockwise as viewed in Fig. 8, and during this retrieving movement it is the function of stop lug 157 of disc 153 to butt against a stop means which in this embodiment of the invention comprises member 163 fastened to the transverse rod 164 to arrest the retrieving motion of disc 153; likewise it is the function of stop lug 159 of disc 154 to butt against other stop means comprising member 165 fastened to the transverse rod 166 to arrest the retrieving motion of disc 154; and likewise it is the function of stop lug 161 of disc 155 to butt against other stop means comprising member 167 fastened to the transverse bar 168 to arrest the retrieving motion of disc 155. In Fig. 8 the full line position of stop lugs 157, 159 and 161 shows these lugs as resting against their respective stop means, the discs 153, 154, and 155 corresponding to these lugs being thus indicated as fully retrieved to their initial position awaiting the time when they will again be engaged to rotate in a counterclockwise direction about their common axis to measure time and lead the centrifugal through its next cycle as previously indicated. Referring now to the means employed to actuate the traveling mechanism causing it to move for the purpose of measuring time, and referring also to the manner in which the traveling mechanism is adapted to be retrieved to its initial position at the end of a cycle, I will state generally that any means whatsoever that will so actuate the traveling mechanism to measure time, and any arrangement whatsoever that is adapted to retrieve the traveling mechanism, will be sufficient for the purposes of this invention. When the traveling mechanism comprises a plurality of rotatably mounted timing members broadly resembling the previously described discs 153, 154 and 155, various means for actuating the same to measure time, can be employed. However, in the particular embodiment of the invention as illustrated in the accompanying drawings, I achieve this function as follows: Shaft 156, Fig. 10 is caused to rotate slowly, making perhaps one revolution in eight minutes, although this rate, which should be a constant rate of speed, may be larger or smaller according as the maximum possible cycle which the equipment may be called upon to time is longer or shorter than that which can be procured when shaft 156 makes eight revolutions per minute. This shaft 156 is carried by the bearings 169 and 170 respectively located in the end castings 78 and 79, see Fig. 10. Also, any suitable driving means whatsoever may be employed for turning shaft 156, but I often drive the same by means of a sprocket 171 rigidly keyed to shaft 156, and this sprocket is connected by means of driving chain 172 with another sprocket 173 which is rigidly keyed to the previously described mixer shaft 2, see Fig. 1. This driving of the control machine 50 from the slowly rotating mixer shaft 2 has certain important advantages, and it is of course understood that if the correct speed relation between mixer shaft 2 and shaft 156 cannot be procured by a single set of sprockets such as 171 and 173, then any suitable form of reduction gears, or other speed changing equipment, can be interposed in any of the ordinary manners. In connection with the discs 153, 154 and 155 of each of the sets of control parts, there is a driving disc 174, see Fig. 10, this disc having a central neck portion 175, best seen in connection with the control set B' in Fig. 10, which also shows how each of these driving discs 174 is rigidly keyed to rotate with shaft 156 by means of pin 176 which is driven into the shaft through neck portion 175 of discs 174. It is around the outer cylindrical surface of neck 175 of the driving discs 174 that the loosely mounted timing discs 153, 154 and 155 rotate during the retrieving motion of the discs, and for the purpose of continually providing sufficient lubrication in the bearing joint between neck 175 and the discs, a self-lubricating bushing 177 is securely pressed into each of the discs, although the bore of these bushings is sufficiently large to permit free rotation around neck 175. For a purpose that will be subsequently described, a wear strip 178 preferably made of some good friction material is fastened to the side of driving disc 174 close to its outer periphery, as best indicated in the sectional view of this disc as shown in control set B′, Fig. 10. With the previously described construction, the following mode of actuating discs 153, 154 and 155, of any of the sets of control parts, will now be apparent. When compressed air is admitted to the engaging cylinder 135, Fig. 11, of that set of control parts, the rollers 146 at the top of lever bars 144 press to the right against the corresponding driving disc 174 as viewed in Fig. 10, whereas rollers 142 at the top of lever bars 139 press with equal force to the left against timing disc 153, and by this means the series of discs 153, 154 and 155 are pressed into frictional engagement with each other and with driving disc 174 by means of the clamping action so set up between rollers 142 on one side and 146 on the other side. This engaging action obviously causes the timing discs 153, 154 and 155 to rotate in unison with the driving disc 174 and shaft 156, the clamping force between rollers 142 and 146 being sufficient so that the frictional grip of the timing discs one with the other, and with the driving disc 174, is sufficient to enable the timing discs to achieve their respective functions of opening the wash fluid valve, closing the same, and stopping the centrifugal as the time cycle which they are adapted to time and impress on their centrifugal proceeds. When the compressed air is subsequently released from engaging cylinder 135, the previously described retrieving spring 148, Fig. 11, of that set of control parts, promptly retrieves lever bars 139 in such manner as to draw rollers 142 away from the opposite rollers 146, thereby unclamping their discs 153, 154 and 155 which leaves the latter free to retrieve to their innitial positions by rotating in a direction opposite to that in which shaft 156 and driving discs 174 are rotating, until the stop lugs of discs 153, 154 and 155 butt against their respective stop members 163, 165 and 168 as previously described. The reader should understand that during this retrieving movement the timing discs 153, 154 and 155 are loose and free from each other and from the driving disc, so that each of them can independently rotate back to its own stop member to be arrested there ready for timing the next cycle. For the purpose of facilitating the retrieving action of the traveling mechanism, any suitable arrangement or expedient whatsoever will be sufficient, such as springs, weight, counterweight, or otherwise. In the drawings, I have shown a separate retrieving weight 179 attached to each of the timing discs by means of cable 180, running in a groove 181 of each of the discs 153, 154 and 155, the end of each cable being fastened or anchored to its disc as shown at 180′ on disc 155, in control set B′, Fig. 10. With such retrieving weights 179 attached to each of the discs, it is clear that every one of the discs in the several sets of control parts is independently retrieved against its particular stop means as soon as the engaging force is removed, as previously described.

I will now describe how each of the rotary timing discs 153, 154 and 155 accomplish their respective functions of opening their wash fluid valve, closing the same, and stopping the centrifugal. As best seen in Figs. 10 and 11, there is, in connection with each of the timing discs 153, a lever 182, also in connection with each of the timing discs 154 there is a lever arrangement 183, and also in connection with each of the timing discs 155 there is a lever 184′, it being understood that there is one such series of levers 182, 183 and 184′, for each set of control parts A′, B′, C′ and D′. As best indicated in Figs. 8 and 9, aided somewhat by Fig. 12, it is seen that the levers 182 and 183 cooperate with a horizontally disposed lever 184, there being one of the latter in each set of control parts A′, B′, C′ and D′. As seen in Fig. 8 the levers 184 are carried on the previously described rod 81 which extends between the end castings 78 and 79. One end 185 of lever 184, see Fig. 8, is adapted, when swung down by rotation around fulcrum rod 81, first to contact with nut 104 fastened to the upper end of valve rod 102 of the wash fluid valve 89, and second by pressing down still further, the lever end 185 is adapted to press the valve rod 102 downward from its position shown in Fig. 8, thereby opening the wash fluid valve as previously described. When the lever end 185 is subsequently swung upward to its position shown in Fig. 8, the wash fluid valve 89 is automatically closed under the action of its closing spring 99, as previously described. At its other end 186 lever 184 is provided with two teeth 187 and 188, these teeth being preferably of tool steel, and each of them being separately fastened to lever 184 by means of a cap screw 189, see Figs. 8 and 9 and particularly control sets C′ and D′ as shown in Fig. 12. These views show that tooth 187 is adapted to co-act with lever 182, while tooth 188 is adapted to co-act with lever 183. As indicated in Fig. 8 the upper surface of tooth 187 is formed so as to cause this tooth to terminate in a distinct edge 190, while the lower surface of tooth 188 is formed so as to cause this tooth to terminate in a distinct edge 191. Before describing the co-action of levers 182 and 183 with lever 184, I will first describe in further detail the construction of levers 182 and 183. In a general way it might be stated that the levers 182 and 183 are rotatably mounted on rod 82, Fig. 8, which as previously described extends between the two end castings 78 and 79. As indicated in Fig. 11, lever 182 terminates at its lower end in a hub 192, and it is through the latter that rod 82 passes for pivotally supporting lever 182 as previously described. The upright portion of this lever is best illustrated in Fig. 9. At its upper end it has a pivot 193, on which is pivotally mounted a pawl 194, which, as viewed in Fig. 9, is normally urged in a clockwise direction around pivot 193 by means of a leafspring 195, this action of the pawl being arrested by stop 196 which is an integral part of lever 182. The leaf-spring 195 is securely fastened to lever 182, by clamping the lower end of the spring between the body of lever 182 and a hardened plate 197 which is fastened to lever 182 by means of screws 198. As indicated in Fig. 9 the lower edge of this plate 197 is adapted to engage tooth 187 of lever 184, in the manner shown. A spring 199 connects lever 182 with lever 184, and in view of this spring being stretched so as to be normally under tension, it serves to normally draw the inner end 186 of lever 184 downward, and it also serves to normally draw lever 182 toward the left against tooth 187 of lever 184, as viewed in Fig. 9. This action of spring 199 normally draws lever 184 into its position shown in Fig. 8, where the end 185 of lever 184 is arrested by an adjustable stop screw 200 carried in a transverse rod 201 which is supported at its ends by two posts 202 rising from platform 86 into which these posts are fastened. The length of bar 201, and the location of its supporting posts 202, is best indicated in Fig. 12. There is a lock nut 203 for each of the adjustable stop screws 200. Turning now to a detailed description of lever 183, attention is directed to Fig. 8, where this lever arrangement is shown in section. From this view it is seen that this lever in fact constitutes the piston of a cylinder 204, the latter having a lower head member 205 and an upper head member 206, the piston lever 183 passing through the latter. Within this cylinder, and fastened to the lower end of piston lever 183, there is a pneumatic cup leather 207 carried between the follower blocks 208 and 209, these blocks and the cup leather being fastened to the lower end of piston lever 183 by means of screw 210. Between the follower 208 and cylinder head 206 there is a compression spring 211 which is normally adapted to push downward on piston follower 208 until the piston and lever 183 is in its lowermost position as indicated in Fig. 8, this position being determined by screw 210 butting against head 205 as shown. Through head member 205 passes the previously described rod 82, which runs between the two end castings 78 and 79 of the machine, and it is around this rod 82 that the entire lever arrangement 183 with its cylinder 204, etc., is permitted a certain amount of rotation for the purpose of allowing certain operations that will be referred to later. Head member 205 is provided with a port 212, and through this port compressed air is admitted to cylinder 204, below cup leather 207, by means of a flexible tube or hose 213 which enters the head end of engaging cylinder 135. The place where the flexible tubing 213 enters the engaging cylinder 135 is such that when compressed air is admitted to cylinder 135 by means of tube 58, this compressed air is immediately by-passed through engaging cylinder 135 into cylinder 204, the air pressure in both these cylinders being built up simultaneously. From the previous description of the apparatus it is understood however, that compressed air is not supplied to engaging cylinder 135 until it is desired to place the corresponding centrifugal under the influence of the control apparatus to time off the centrifugal cycle. Consequently, just prior to that time, there is no compressed air either in the engaging cylinder 135 or its connected cylinder 204, and consequently at that time all the lever parts just described are in the relative position in regard to each other as shown in Fig. 8. The piston lever 183, though not connected with spring 199, is nevertheless held over to the left, against tooth 188, see Fig. 8, by means of this spring 199, the force of the latter being applied directly to lever 182, and the latter imparting a portion of this force to piston lever 183 by means of a stop pin 214 securely pressed into lever 182 but adapted to reach across behind lever 183, as is more clearly indicated in connection with control sets C' and D' in Fig. 12. At this time tooth 188 of lever 184 lies in an elongated notch extending above shoulder 215, of piston lever 183, as is best indicated in Fig. 8. If it be now assumed in connection with Fig. 8 that the operator at one of the centrifugals throws the latter under the influence of the automatic control machine by supplying compressed air to the control cylinder 135 of that centrifugal, it will be understood that this compressed air will simultaneously enter cylinders 135 and 204, and because of the cup leather 207, the compressed air will immediately raise piston lever 183 causing the shoulder 215 thereon to contact with the edge 191 of tooth 188, thereby lifting this tooth and the corresponding end of lever 184, until the edge 190 of tooth 187 is caught under the lower edge of plate 197, of lever 182, which is the position of the parts as indicated in Fig. 9. Unless lever 182 is in some manner slightly rotated clockwise around its supporting rod 82 so as to release tooth 187 from under the lower edge of plate 197, it will not be possible for the compressed air in cylinder 204, acting through shoulder 215 on the piston lever 183, to lift end 186 of lever 184 further than the position shown in Fig. 9. In this position it is noted that the outer end 185 of lever 184 has moved down out of contact with the adjustable stop 200, but it has not yet come in contact with the adjusting nut 104 on top of valve stem 102 of the wash fluid valve 89. In fact the object of the adjusting nut 104 with its jam nut 105, is to permit the nut 104 to be set sufficiently low on valve stem 102 so that the lever end 185 cannot contact with nut 104 at the time that tooth 187 is restrained under plate 197 of lever 182, as illustrated in Fig. 9. In other words the clearance between lever end 185 and nut 104 at this time, insures that the wash fluid valve 89 will not be opened by the act of moving lever 184 from its initial position shown in Fig. 8 to its intermediate position shown in Fig. 9. If it be assumed, however, that lever 182, Fig. 9, is now in some way rotated slightly to the right around its fulcrum rod 82 so as to release the edge 190 of tooth 187 from under plate 197, then it is apparent that shoulder 215 on the piston lever 183, see Fig. 8, which is at this time in contact with edge 191 of tooth 188, will immediately snap the tooth and lever end 186 upward under the pressure of the compressed air in cylinder 204 until the stop pin 218 which is securely fastened into lever 183, collides with the lower surface of cylinder head 206 thereby preventing the further elevation of piston lever 183 or of end 186 on lever 184. During this action the outer end 185 of lever 184, has been considerably depressed below its position indicated in Fig. 9. In fact it has been sufficiently depressed so that this end of the lever has not only contacted with nut 104 on the valve stem, but has actually pushed this nut and valve stem down sufficiently to open the wash fluid valve 89. As long as the various parts remain in the position in which they then are, the force of compressed air in cylinder 204 will hold the wash fluid valve 89 open, and the washing fluid will flow freely therethrough from header 106 and out through pipe 61 to spray against the material in the particular centrifugal which is connected with that valve 89. With the parts in this position, if it be now assumed that the piston lever 183 and its connected cylinder arrangement, is in some way rotated to the right from its position shown in Fig. 8, (this rotation of course being around fulcrum rod 82), it is apparent that shoulder 215 of piston lever 183, will be drawn out from under the edge 191 of lever tooth 188, and thereupon, under the action of the previously described tension spring 199, lever 184 will immediately snap back to its initial position shown in Fig. 8, the outer lever end 185 butting against stop screw 200, and the wash fluid valve 89 immediately closing to cut off the flow of wash fluid to its centrifugal, this closing of the valve being accomplished by means of the valve closing spring 99 as previously described. In spite of the fact that the wash fluid valve 89 was closed by this action, nevertheless the piston lever 183 will remain in its uppermost position with its stop pin 218 butting against the lower surface of cylinder head 206, but as soon as the compressed air is released from engaging cylinder 135 at the end of the centrifugal cycle, the compressed air will simultaneously be released from cylinder 204, and by action of the retrieving spring 211, the piston lever 183 will be promptly retrieved to its lowermost and initial position, with its screw 210 butting on cylinder head 205 as shown in Fig. 8. If at this time, or previously thereto, the levers 182 and 183 are released from the above assumed force which rotated them slightly to the right around their fulcrum rod 82, for the purpose of successively releasing teeth 187 and 188 from these levers as previously described, it is apparent that these levers 182 and 183 will be retrieved to the left around their fulcrum rod 82 under the action of spring 199 which acts directly on lever 182 to retrieve it, and indirectly on lever 183 through the previously described pin 214 projecting from lever 182, which retrieves the piston lever 183 along with lever 182 until they both contact with teeth 187 and 188. When this action is completed, all the parts will be back to their initial position as illustrated in Fig. 8, which is the position that these parts are in prior to the opening of the centrifugal cycle. In order to more plainly indicate the successive positions of lever 184 during the above described operations, I have, in Figs. 8 and 9, indicated the center line of this lever in its various positions mentioned. This center line in these various positions, is indicated by the four dot and dash lines W—W, X—X, Y—Y and Z—Z in Figs. 8 and 9. The center line is deemed to be a fixed line on lever 184, and passes through the center of teeth 187 and 188, also through the center of the lever fulcrum 81, and then through the actuating point 185′ formed under the end 185 of lever 184. When the parts are in the position shown in Fig. 8 this center line of lever 184 is at W—W. At this time there is no compressed air in cylinder 204 or engaging cylinder 135. However, if these cylinders are energized with compressed air—as occurs when the operator throws the corresponding centrifugal under the influence of the control parts by moving the three-way valve 56 into its position as shown under centrifugals A, B or D, Fig. 1,—then the piston lever 183 immediately lifts the adjacent end of lever 184 and rotates the latter slightly until its center line is at X—X, Figs. 8 and 9, the lever 184 being restrained against further rotation by virtue of its tooth 187 being hooked under plate 197 of lever 182 as shown in Fig. 9. During this operation the upper extremity 219 of piston lever 183 moved up from its full line position shown in Fig. 8 to its dotted line position 219' shown in the same figure. Since the actions just described were accomplished by admitting compressed air to the engaging cylinder 135 as well as cylinder 204, it follows that simultaneously therewith the engaging cylinder clamped the corresponding series of timing discs 153, 154 and 155 against their driving disc 174 thereby causing these timing disc to commence to rotate in unison with each other, and with their driving disc 174, and with the slowly rotating shaft 156. As previously stated, this rotation of the timing members will be counterclockwise as viewed in Figs. 8 and 9. As the rotation proceeds, the operating lug 158 of timing disc 153 will presently engage the outer end of pawl 194, and will draw this pawl and its connected lever 182 to the right as viewed in Figs. 8 and 9, in the course of which, plate 197 on lever 182, Fig. 9, will be withdrawn from tooth 187 of lever 184, and under the action of the compressed air in cylinder 204, the shoulder 215 of piston lever 183 will immediately carry the lever tooth 188 and the adjacent end 186 of lever 184 upward. During this action the opposite end 185 of lever 184 will have opened wash fluid valve 89 in a manner previously described. This valve opening action will be limited by the stop 218, on piston lever 183, at the place where this stop butts against the lower surface of cylinder head 206, as previously described. During this valve opening action, the previously described center line of lever 184, will have rotated from its position X—X, Figs. 8 and 9, to its outermost position Z—Z, but it was only after the intermediate position Y—Y was reached that the lever point 185' contacted with nut 104 to commence the actual opening of the valve, and the true valve opening action was then continued from center line position Y—Y to Z—Z, the wash fluid valve 89 being fully open at the latter position. During this operation the upper extremity 219 of piston lever 183 will have moved upward from its dotted line position 219' to its dotted line position $219^2$, Fig. 8, and in this latter position it will be noticed that the piston lever 183 is within range of the operating lug 160 on timing disc 154 when said lug in the course of its rotation, presently reaches this piston lever 183. Before this occurs however, it is probable that the operating lug 158 of disc 153, will have carried the upper edge of pawl 194 sufficiently to the right, Fig. 9, to disengage itself at point 220 from the operating lug, and thereupon pawl 194 and lever 182 are immediately retrieved to the left almost to the full line position shown in Fig. 9, this retrieving being accomplished through the tension spring 199 as previously indicated. Disengaging point 220 is located approximately at the intersection of arc 221, Fig. 9, representing the course of the pawl extremity 194' during rotation around fulcrum 82, with arc 222 representing the course of the outer extremity of the operating lug in its rotation with shaft 156. After the operating lug 158 has thus been disengaged from pawl 194, this lug will continue to rotate in a counterclockwise direction away from pawl 194 and lever 182, and behind it instead of in front of it as before. During this time however, the operating lug 160 of the timing disc 154 will be approaching and will finally reach and engage piston lever 183 which at this time is extended to its uppermost position $219^2$, Fig. 8. As a result of this engagement lug 160 will slowly move piston lever 183 to the right, Fig. 8, and thereby close the wash fluid valve 89 by withdrawing shoulder 215 of lever 183, from under edge 191 of lever tooth 188, which permits spring 199 to snap lever 184 back to its initial position shown in Fig. 8, and also permits the valve closing spring 99 to instantly close the valve as previously indicated. It is in this manner that the operating lug 160 of timing disc 154 effects the closure of the wash fluid valve 89 and stops the flow of fluid to the centrifugal, whereas the operating lug 158 of timing disc 153 had previously effected the opening of this valve to start this flow by its above described action on pawl 194 and lever 182. Even after the wash fluid valve 89 has been closed in this manner, the operating lug 160 will continue to carry piston lever 183 forward until the previously described disengaging point 220 is reached. As a matter of fact during this operation the piston lever 183 will be carrying lever 182 ahead with it, this being due to the pin 214, Fig. 8, which projects from lever 182 and engages the rear face of lever 183. Therefore after the operating lug 160 rotates beyond the disengaging point 220, so as to release the piston lever 183, the latter is immediately retrieved toward lever tooth 188, this retrieving action being set up by spring 199 acting through lever 182 and pin 214 to retrieve the levers 182 and 183 as stated. After this the two operating lugs 158 and 160, of timing discs 153 and 154 will be behind levers 182 and 183 instead of in front of them as they originally were. The entire set of timing discs 153, 154 and 155 will of course continue to rotate counterclockwise as viewed in Fig. 8 and in the course of this rotation, the operating lug 162 on timing disc 155, will presently stop the centrifugal by coming in contact with the previously mentioned lever 184', as will now be described. This lug 162, and lever 184' are best indicated in Fig. 7. As there seen, lever 184' is formed like a bell crank, having a hub 223' adapted to provide a fulcrum around the previously described rod 82, and from the upper portion of this hub extends a vertical lever arm terminating at 224" within range of operating lug 162, while from the side of this hub extends a horizontal lever arm having an aperture 225" near its outer extremity. Through this aperture passes the previously described screw 125 which is fastened into the lower end of stem 116 of the power control valve 90. By virtue of this arrangement the lever 184' is adapted to raise or lower valve stem 116 for the purpose of releasing compressed air through tube 127 to the power and brake cylinders 52 and 53 located at the corresponding centrifugal, or for the purpose of exhausting the compressed air from these cylinders, all in accordance with the detailed description of control valve 90 as previously given. It is therefore apparent from Fig. 7, that when operating lug 162 presently contacts with lever extremity 224", it then draws this extremity toward the right, and in view of the bell crank arrangement of lever 184', this action lifts valve stem 116, causing the control valve to close at seat 114 and open at seat 113 thereby releasing compressed air to the power and brake cylinders 52 and 53, as stated. It is in this way that the operating lug 162 on the timing disc 155 stops its centrifugal after the timing member has, by the amount of its rotation, measured off the proper period of time. When the timing parts reach the position just mentioned, the downwardly facing valve seat 114 in valve 90, will be engaging the valve face 118 and will act like a limit stop to prevent valve stem 116 from rising further, and this action will of course be transmitted to lever 184' preventing the same from moving further under the impulse of the timing lug 162. That is, the upper extremity 224" of lever 184' will, after opening the control valve 90 as just described, act as a stop for lug 162, and will therefore cause the timing disc 155 to slip in relation to its previously described driving disc 174 even though the engaging means is still clamping these members in frictional engagement. In other words when this position of the timing parts is reached, the discs 153, 154 and 155 will all cease to rotate, even though their driving disc 174 continues to rotate with shaft 156, and even though all these discs continue to be held in frictional engagement by virtue of the compressed air in the engaging cylinder 135. The parts are all so proportioned with reference to each other that the frictional driving force so created by the engaging means will in no way injure any of the parts, but will on the contrary easily enforce the slipping action between disc 155 and the adjacent driving disc 174 as just set forth. In view of the slow rate of rotation of the driving disc 174, the slipping action will cause very little or no wear, but notwithstanding, it is helpful to furnish the wear ring 178 which is fastened to disc 174 as previously described. This ring can be of some relatively soft material, so as to take all the wear that does occur, and eventually if this ring becomes noticeably worn it can be easily replaced having served in the meantime to spare the other members from wear. It will also be noticed that during this slipping action between discs 155 and 174, there will be no slippage whatever between the set of discs 153, 154 and 155. This is because none of these discs will turn after the rotation of disc 155 ceases. When the operator at the centrifugal whose cycle has just been completed, throws the three-way valve 56 into the position shown under centrifugal C, Fig. 1, the compressed air in the engaging cylinder 135 and in valve opening cylinder 204 is immediately released through the exhaust port 56³ of valve 56. Thereupon the rollers 142 of the engaging means immediately snap away from their adjacent timing disc 153, which condition is illustrated in control set C', Fig. 10, and this action permits each of the timing discs 153, 154 and 155 to be independently retrieved against their respective stops 163, 165 and 167, all as previously described. During this retrieving action the operating lug 160 of timing disc 154 will not encounter piston lever 183 for the reason that this lever will have been fully retrieved to its lowermost full line position as shown in Fig. 8. This is due to the fact that the air was exhausted from cylinders 135 and 204 simultaneously, so that the retrieving spring 211 in cylinder 204 had ample opportunity to fully retrieve piston lever 183, before the more slowly rotating discs got well under way with their retrieving action. On the other hand the operating lug 158 of disc 153 will encounter pawl 194 during this retrieving motion, but the pawl will accommodate itself thereto by rotating counterclockwise about its pivot 193, Fig. 9. In this way the pawl 194 will permit the operating lug 158 to be retrieved past it, and after the lug has gone by, the pawl 194 will itself be retrieved against stop lug 196 by action of the leaf spring 195, as previously described. As to the operating lug 162 of timing disc 155, it will be noticed that this lug never passed beyond extremity 224" of lever 184', see Fig. 7, and therefore when the set of timing discs are disengaged in the manner aforesaid, disc 155 with its lug 162 is free to retrieve against its stop 167, Fig. 8. As soon as the operating lug 162 moves away from lever 184', the balance of the latter is such that the valve stem 116 of control valve 90 is immediately drawn downward so as to close this valve at seat 113 and open it at seat 114, thereby cutting off the supply of compressed air from header 128, and immediately exhausting the air from the power and brake control cylinders 52 and 53, this air passing back through tube 127, down past valve seat 114 which is then open, and out through the exhaust ports 122 of the valve. This fully releases the centrifugal from the influence of the control equipment, and the operator is free to release the brake by lifting hand brake 124, and to start the centrifugal turning to permit him to unload the centrifugal with his mechanical discharger as previously referred to.

If the reader will now refer to Figs. 10 and 11, and read them in connection with Fig. 1, it will be noticed that the different centrifugals A, B, C, and D, and their corresponding sets of control parts A', B', C', and D', are in various phases of the cycle, and Figs. 10 and 11 illustrate the side view of the different control parts in these various phases, the same as Figures 7, 8 and 9 illustrate the front view thereof. For instance it will be noticed in Fig. 1 that the three-way valve 56 of centrifugal C is in its released position, thereby indicating that this centrifugal is released and free from its set of control parts C' on control machine 50. That is, there is no compressed air in engaging cylinder 135, or in valve opening cylinder 204 of this control set C'. Therefore in view of the explanations previously made, the piston lever 183, Figs. 10 and 11, is shown in its lowermost position, and the timing discs 153, 154 and 155 are shown fully retrieved. The latter relationship is indicated by the fact that stop lug 159 of disc 154 is resting against its stop member 165, and that stop lug 161 of disc 155 is back against its stop member 167. In Fig. 10 only a fragment of stop members 167 is shown, in order to keep the drawings more simple. It will also be understood that the stop lug 157 of disc 153, in control set C', will be back against its stop member as illustrated in Fig. 8, but this relationship does not appear in Fig. 10 for the reason that the parts are on the opposite side of timing disc 153. As to the other centrifugals A, B, and D, it will be noticed in Fig. 1, that their valves 56 are all in the engaging position, i. e., they are all shown as supplying compressed air to the cylinders 135 and 204 of the corresponding control sets A', B' and D' of control machine 50. In Fig. 10, control set D' is indicated as about to open the wash fluid valve 89 of its centrifugal D. This is shown by the fact that the operating lug 158 of timing disc 153 is about to contact with pawl 194 of lever 182, and as previously explained this is the manner in which timing disc 153 opens the wash fluid valve 89 of the corresponding control set D'. At this moment, and at all times since the compressed air was admitted to cylinder 204, the piston lever 183 of control set D' has been elevated to its intermediate position as indicated in Fig. 10. It is in this position that its upper extremity 219', corresponds with the dotted line position 219' thereof as shown in Fig. 8, and it is in this position that the previously described center line of lever 184 is located at X—X, Figs. 8 and 9. By comparing the position of levers 183 in control sets D' and C' in Fig. 10, the amount of movement from the initial released position thereof as shown in control set C', to the intermediate position shown in set D' will be noticed. Control set B' in Fig. 10 illustrates the relation of the parts a few moments subsequent to that illustrated in control set D'. In the latter its wash fluid valve 89 has not yet been opened, but set B' shows the parts just after this valve is opened. The operating lug 157 of timing disc 153 has contacted with and moved pawl 194 and lever 182 sufficiently to open the valve as is indicated by the fact that piston lever 183 in control set B' is at its uppermost position. This position is seen to be higher than that in either control sets C' or D', and corresponds to a fully opened wash fluid valve. At this time the upper extremity $219^2$ of piston lever 183 corresponds to its uppermost dotted line position $219^2$ in Fig. 8. The center line of lever 184 will at this instant be at Z—Z, Fig. 8. In Fig. 10 control set A' shows the position of the parts after the wash fluid valve 89 has been closed, and at the moment that centrifugal A is about to be stopped by admitting compressed air from control valve 90 to the power and brake cylinders 52 and 53, Fig. 1. At this time operating lug 158 of timing disc 153, and operating lug 160 of timing disc 154, have traveled beyond their respective levers 182 and 183, as illustrated in set A', Fig. 10, and the operating lug 162 of timing disc 155 is about to engage the bell crank lever 184' to open control valve 90 as previously described. When this occurs the compressed air will be released to the power and brake cylinders 52 and 53 of centrifugal A, Fig. 1, and this centrifugal will be stopped all in accordance with the detailed description previously given.

In reviewing the above described valve opening action, it will be understood that the wash fluid valve 89 can be opened and closed by the timing or traveling mechanism in a great many different ways. My object in using some arrangement such as the valve opening cylinder 204, is simply so that the wash fluid valve will be opened quickly and to its full extent at the immediate moment when the washing action is commenced. In this connection it is obvious that the traveling mechanism, which in this case comprises the discs 153, 154 and 155, is traveling at a very slow rate of speed, and consequently if the slow movement of the traveling mechanism is used to directly open the wash fluid valve, the valve would open only gradually, and even if the movement were speeded up with some intervening lever arrangement, it would still take several seconds from the instant when the valve commenced to open to the instant when it is fully open. This gradual opening of the valve could be noticed by the shape of the spray at the nozzle 60 or 62 at the centrifugals. This spray would start off weak and would gradually build up to a full strong spray as the valve gradually opened further and further, and this is not so desirable as compared with a spray that builds up its entire strength practically instantly. It is this latter result that is accomplished by my quick opening valve arrangement which is instantly opened to its full amount as soon as the traveling mechanism has moved lever 182 sufficiently to draw plate 197 off of edge 190 of tooth 187, see Fig. 9. Instead of procuring this quick valve opening action by means of cylinder 204 and other parts illustrated in the drawings, various other equivalent mechanisms can be used including arrangements that gradually accumulate the valve opening force in a spring and then suddenly release this force to open the valve quickly at the moment that the trigger is snapped off for the purpose.

In further review of the previously described cycle actions, the following relations should be noticed. In Fig. 8 I have illustrated by dotted lines one of the previously described operating lugs, and to this lug I have attached the three reference numerals 158', 160' and 162'. The reason for these three reference numerals is that this is the precise position first, at which lug 158 opens valve 89 by releasing lever tooth 187 as previously described; second, it is the precise position at which lug 160 closes valve 89 by releasing lever tooth 188 as previously described, and, third, it is the precise position at which lug 162 stops the centrifugal by fully opening valve 90 through lever 184' as previously described. With this in mind it will now be apparent that after the centrifugal is placed under the influence of the control parts, the wash fluid valve 89 of that centrifugal will be opened at the end of a period of time which is measured or predetermined by the distance which lug 158 of timing disc 153 must travel in moving or rotating from its full line position shown in Fig. 8 to its previously described dotted line position 158'. Likewise after another period of time which is measured or predetermined either by the distance between the full line position of lugs 160 and 158, Fig. 8, or by the distance between the full line position of lug 160 and its dotted line position 160', this wash fluid valve 89 will be closed. And likewise after another period of time which is measured or predetermined either by the distance between the full line position of lugs 160 and 162, Fig. 8, or by the distance between the full line position of lug 162 and its dotted line position 162', the centrifugal will be stopped by supplying compressed air to the power and brake cylinders 52 and 53 as previously described. It will also be apparent that the length of the predetermined time periods just described will remain exactly the same for cycle after cycle so long as the distances from the dotted line position 158', 160', and 162' of the operating lugs, to their respective full line positions 158, 160 and 162, remain unchanged, and since these distances are identical in the different sets of control parts, it will also be obvious that this arrangement leads all of the centrifugals through identically the same time cycle for charge after charge, thereby insuring that all of the material passing through the centrifugals will be uniformly treated. Obviously this eliminates the irregularities of manual control which were described in the early parts of this specification, and the absolute uniformity insured by my collective arrangement constitutes one of the important benefits of this invention.

In regard to measuring the amount of washing fluid applied to each centrifugal during each cycle, it will be noticed that this is uniformly accomplished for all the centrifugals as follows: As previously described, each of the wash fluid valves 89 corresponding to the different centrifugals will be held fully open for an identical period of time during each cycle. This time corresponds to the distance between lugs 158 and 160. Therefore since the fluid pressure in header 106 is maintained at a constant amount, and since the size of the apertures in the distributing nozzles 60 or 62 at the centrifugals are all alike, it follows that the quantity of wash fluid dispensed each time to the centrifugals will be alike for all the centrifugals. This is based on the elementary principle of physics that with a given pressure head, equal quantities of fluid will always pass through a given aperture in equal periods of time. Instead of measuring the quantity of fluid by this time controlled system, it is possible to use in connection with this invention other methods of measurement, as for instance the volumetric method, but I prefer a time controlled valve for this purpose.

I will now describe the arrangement for changing the lengths of time comprising the various above mentioned periods, i. e., the length of time preceding the moment when the washing action commences in any centrifugal, likewise the length of time preceding the moment when this washing action ceases at the centrifugal, and likewise the length of time preceding the moment when the centrifugal is stopped. As previously indicated the lengths of these periods of time are measured or predetermined by the distance that the traveling mechanism must move from its initial position against the stop member to the positions at which the above described functions are performed. Therefore, broadly speaking, any arrangement for changing these distances, either by moving the places where the functions are performed, toward the stop member, or by moving the stop members toward the fixed places where the functions are performed, will, for the purposes of this invention, serve to change the above mentioned predetermined periods of time. In the particular embodiment of the invention shown in the accompanying drawings, I have illustrated an arrangement wherein the stop members 163, 165 and 167, Fig 8, are changed in position, i. e., moved toward or away from the fixed place represented by the dotted teeth 158', 160' and 162' at which the above described functions are performed. Any arrangement that will permit changing these positions of the stop members, will be sufficient for the purpose of this invention, and it is obvious that many different arrangements can be made for this purpose. For instance, as an example of a very simple but rather crude arrangement for covering this feature, I submit the following: As previously described, each of the stop members 163, 165 and 167 are fastened to their respective bars 164, 166 and 168, these bars running lengthwise of the machine 50. As indicated by dotted lines in Fig. 8, a series of equally spaced holes 223 can be circularly arranged in a disc member 224 which is rigidly fastened to end casting 79, and a similar series of holes, not shown, can be arranged in a corresponding disc 225 fastened to end casting 78. The holes in disc 225 should be in exact alignment with the holes in disc 224, and although only a few of these holes have been indicated by dotted lines in Fig. 8, it will be understood that they can exend practically all around the discs, and at a uniform radial distance from shaft 156. The rods or bars 164, 166, and 168 can then be made sufficiently long so as to enter these holes 223 in the discs 224 and 225, and be carried thereby. Each of these stop bars should of course enter the corresponding hole in the opposite discs as its position and direction will then always be parallel to the other stop bars, and to shaft 156. With this arrangment, if it is desired to change any of the above described time periods, as for instance the period controlled by stop bar 166, it will be sufficient to slip this bar out of the particuar holes 223 in which it has been previously located, and to reinsert it in another pair of holes 223 located either closer or further from the dotted teeth 158', 160' and 162', Fig. 8. In the same manner the positions of stop bars 164 and 168 can be changed, if it is desired to change the periods of time which they respectively control. The length of the new adjusted periods of time will always be measured or predetermined by the particular pair of holes 223 into which any of the stop bars 164, 166 and 168 have been inserted. Obviously this arrangement permits the collective and simultaneous changing of any of the above described time periods for all the sets of control parts in the control machine 50, and therefore for all of the centrifugals in the mixer group which is controlled thereby. The arrangement just described has the advantage of being very simple, but is rather crude and is unsatisfactory in some respects. There is always a possibility that one of the operators may take out one of the stop bars, and instead of putting it into a new pair of holes 223 as he intended to do, he may actually mislay the bar and thereby make it difficult or impossible to subsequently operate the equipment until this bar is again found. Also there is a possibility that the operator may not correctly insert one of the stop bars in the corresponding holes 223 in the opposite discs 224 and 225. He may put it in one hole in the one disc and into the wrong hole in the opposite disc, thereby causing the stop rod to run slantwise along the machine which would obviously disturb the uniformity of its time period as between the different sets of control parts. Clearly this would be objectionable. In view of the foregoing disadvantages, I prefer not to use such loosely mounted stop rods 164, 166 and 167, and therefore in actual practice I omit the above described holes 223 in the opposite discs 224 and 225. Instead of this expedient I prefer a more workmanlike mounting for the stop bars 164, 166 and 168. Any arrangement that will keep these bars permanently connected and fastened to the control machine 50, and that will also provide for changing the position of these bars in a manner that will always keep them parallel to themselves and parallel to each other, I consider more advantageous than the loosely mounted bars held in holes 223 as previously described, although the latter will fully satisfy the requirements of my invention, and falls within the terms thereof, if the user is satisfied with this expedient. The drawings illustrate one satisfactory embodiment of the more workmanlike mounting just proposed for the stop rods. In Fig. 10 this mounting shown for stop bar 166, may be considered typical of the mounting of all the stop bars. The mounting of the other stop bars 164 and 168 is practically identical with that of 166, but the other mountings have been omitted from Fig. 10 in order to preserve clearness of illustration. It will be seen from this figure that the stop bar 166 does not extend as far as the discs 224 and 225, but instead its extremities 166' are embedded respectively in certain arms 226 and 227, and are securely and non-rotatably fastened thereto by means of pins 166². In an identical manner the stop bar 164 is respectively fastened into arms 228 and 229, and stop bar 168 is respectively fastened into arms 230 and 231, as is quite clearly illustrated by reference to Figs. 7, 8, 9 and 10. All of the arms 226, 228 and 230 are identical with each other, and likewise all of the arms 227, 229 and 231 are identical with each other. Therefore a description of arm 226, Fig. 10, will be typical of the first series, and a description of arm 227 will be typical of the second series. At their inner extremities these arms are all loosely mounted on shaft 156, so that the latter can rotate freely without moving the arms, and also any of the arms could be rotated around shaft 156 irrespective of the rotation of the latter. At their outer ends the arms 226 and 227 carry a pinion rod 232 rotatably mounted therein. The outer extremities of this rod are equipped with pinion teeth 232', the latter being adapted to mesh with teeth 224' and teeth 225' respectively cut on discs 224 and 225, all these teeth, both on the discs and on the ends of the pinion rod being cut in exact alignment with each other. On the arm 226 there is mounted a substantial hand screw 233 which is threaded into the arm at 234 as shown in Figs. 7 and 10. If this hand screw is fastened down against the pinion rod 232, the frictional grip prevents the latter from rotating within arms 226 and 227, and in view of the pinion teeth 232' on rod 232, the pair of arms 226 and 227 are securely locked against movement either with or around the slowly turning shaft 156. This is because the pinion teeth 232' mesh with teeth 224' and 225' on the fixed discs 224 and 225. However if the operator loosens hand screw 233, so as to permit pinion rod 232 to rotate in arms 226 and 227, he can then move the arm 226 clockwise or counterclockwise around shaft 156, Fig. 7, and in view of the pinion rod 232, the opposite arm 227 will move in exact unison and parallel alignment with arm 226. This is due to the exact alignment of the gear teeth on the fixed discs 224 and 225, and to the similar alignment of the pinion teeth 232' at the opposite ends of pinion rod 232. These aligned teeth meshing with each other insure continuous parallel alignment during such movement, not ony of the pinion rod 232 itself, but also of the arms 226 and 227, and also of the stop bar 166 carrying the stop members 165. In fact it is this arrangement which I use for changing the position of the stop bar 166, and for keeping this bar continuously parallel with itself and with the other stop bars and with shaft 156 during this adjustment. With this arrangement described it is not possible for stop bar 166 to get out of this parallel alignment, and this therefore prevents the possibility of this bar occasionally being slanted across the machine as was previously described in connection with the alternative mounting of this bar in holes 223. When the stop bar 166 has been shifted sufficiently to procure the desired adjustment, the hand screw 233 is again fastened down against pinion rod 232, and this locks the arms and stop bar securely in the new position. As previously stated the stop bars 164 and 168 are carried and adjusted by an arrangement which is identical with that just described for the stop bar 166. In connection with these other two stop bars, the pinion rods 235 and 236 correspond to the previously described pinion rod 232, and the hand screws 237 and 238 correspond to the previously described hand screws 233, all of which is best seen in Figs. 7, 8 and 9. Consequently, in order to change the position of any or all of the stop bars 164, 166 and 168, for the purpose of changing the time periods which they control, simultaneously for all the centrifugals, it is merely necessary to loosen the hand screws 237, 233 and 238, and draw them to the right or left, which will change the positions of the stop bars as desired, their parallel alignment with each other being continually and automatically preserved by the arrangement described. When the stop bars are in their new adjusted positions, they can all be locked there by refastening the hand screws 233, 237 and 238. In order to make possible the quick and easy reading of the time period for which any of the stop bars is set, I have attached pointers 239, 240 and 241, see Fig. 7, to the respective arms 228, 226 and 230 carrying the stop bars 164, 166 and 168 as previously indicated. These pointers are fastened to their respective arms by means of screws 242 as best seen in Figs. 7 and 10. These pointers reach around in front of disc 225, and the forward face of same can be calibrated in minutes and seconds as shown in Fig. 7, or in any other suitable manner that would best serve the requirements of the user of this equipment. The full line positions of the pointers as illustrated in Fig. 7, show that the setting of the control equipment is such that the wash fluid valve of any centrifugal will be opened after one minute and twenty-four seconds, that this valve will be closed after two minutes and twelve seconds, and that the centrifugal itself will be stopped after approximately four minutes and four seconds, all of which predetermined periods of time are in this case measured from a common starting point, to wit: the moment when the centrifugal is placed under the influence of the control. This gives a clear and direct method of reading and calibrating the time periods, although in some forms of this invention other modes of spacing, measuring and calibrating the time periods can be used, such as making some or all of the time periods successive to each other so that the end of one is the beginning of the next, etc., throughout the cycle, all of which is within this invention. In Fig. 7 the dotted line positions 239', 240' and 241', of the pointers, illustrate how all these pointers and their connected parts can be brought together to give a true zero reading for all the time periods which they respectively control, and the corresponding dotted line positions 164', 166' and 168', of the stop bars and their associated parts, see Fig. 8, illustrate the relative positions of these parts when the pointers are all brought together at zero. From the foregoing descriptions it will now be understood that if any or all of the pointers 239, 240 and 241 are shifted from their positions shown in Fig. 7, to some new position, the time periods which they respectively control will have been collectively, simultaneously and equally changed for all the centrifugals in the mixer group, and the new values of these time periods can be read directly from the dial shown in Fig. 7, by means of the pointers.

In this connection it is important to note that I have provided separate, although rather identical adjusting means for each of the time periods. It is by reason of this that the adjustments can be collectively made for all the centrifugals, but that they can still be easily and immediately changed as among themselves. As stated in the opening part of this specification, this flexibility as between the different collective adjustments is a very essential feature of this invention. Its significance can perhaps be better understood by comparing it with some assumed arrangement such as mine would be if I omitted the separate adjusting means, but somehow provided for speed changes of my actuating or timing shaft 156, using such speed change as a means of adjustment. This would give a very crude kind of collective control, but it would be useless in practice because the cycle would be of a fixed or rigid nature, instead of flexible. That is, if the speed of shaft 156 were increased say ten per cent, to increase one particular time period ten per cent, this would unfortunately increase all the periods ten per cent, although such increase was desired only in one of them. Obviously such an arrangement would not permit flexibility between the different time periods on a collective basis like my described arrangement, but would amount merely to a magnification and demagnification of a fixed and rigid cycle. This is useless in practice and does not come within the spirit of my invention, which as previously stated embraces the essential feature of flexibility between the different collective adjustments, instead of rigidity in the cycle.

In connection with Fig. 8ª, shown to the left of Fig. 8, I would now like to call attention to an additional refinement and extension of the adjusting means previously descirbed, and to the reasons therefor. In practice it is occasionally found that the various centrifugals in a mixer group do not all run at the same maximum speed of rotation. This is due to the fact that the clutches of some of them occasionally slip, or to other causes. In such circumstances it may be desirable to somewhat increase the respective time periods for a centrifugal that is running more slowly than the others in the mixer group, the object of such increase being to allow such slow centrifugal to compensate for its poorer centrifuging power, by running and washing a little longer than its more rapidly rotating mates. To permit such individual compensation for any particular centrifugal, I can arrange my equipment with individual adjustments, as well as collective adjustments for the centrifugals. This can be done in a great many ways. In Fig. 8ª I have indicated one mode of accomplishing this result. This figure shows an adjusting screw 243, bent in the arc of a circle which is concentric with shaft 156 and with the various timing discs 153, 154 and 155. This adjusting screw 243 has a head 244, and also adjusting nuts 245. Though in Fig. 8ª, I have only shown one such adjusting screw, it will be understood that such a screw with its head and fastening nuts, can, if desired, be attached to each and every one of the stop members 163, 165 and 167, of all the sets of control parts A', B', C' and D'. The head 244, of the adjusting screw 243 will receive the various stop lugs 157, 159 or 161 of the various timing discs. Therefore, in order to individually adjust or compensate any or all of the time periods, of any or all of the centrifugals, it is merely necessary to run the fastening nuts 245 back or forth along the adjusting screws 243, thereby advancing or retarding the butting head 244, until the desired amount of compensation to be procured from that adjusting screw has been obtained. In this way it will be noticed that my equipment can at the same time be made individually adjustable for all the centrifugals, as well as collectively adjustable. In fact by making the adjusting screws 243 long enough, it would be possible to satisfy all adjustments by merely using these individual adjusting screws 243 without resorting to the collective adjusting means previously described. I suggest however that instead of using any individual adjusting screws 243 at all, it is much more advisable to compensate for the individual speed variations between the different centrifugals, by eliminating such variations. This can usually be done in several ways, for instance adjusting the driving clutches of the centrifugals, tightening the belts, and in other well-known ways. Since these latter expedients are always available for adjusting the speeds of the individual centrifugals, I recommend that they should always be resorted to for the purpose of producing uniformity of speed amongst the various centrifugals, as this corrects the trouble by eliminating it, which is obviously better than continually suffering the trouble and then individually compensating for it by the individual adjusting screws 243 at the control equipment. If this is done there is no need for the individual adjusting screws 243 shown in Fig. 8ª, and they can well be omitted, leaving all adjustments to me made by the collective adjusting arrangements previously described. These collective adjustments will have to be made for all the centrifugals, from time to time, as the character of the material supplied to the centrifugals from the mixer tank 1 changes.

In connection with Fig. 2, I will now describe one arrangement which I sometimes use for shifting the liquor gate 30 back and forth to direct liquor first to trough 31, then to trough 32, etc., as the centrifuging proceeds. As was described in the early parts of this specification, it is often desired to collect in one trough 31 the original liquor that spins out of the basket prior to the commencement of the washing action, and to collect in the other trough 32 the liquor that spins out of the basket subsequent to the commencement of the washing action. This is accomplished by my arrangement shown in Fig. 2 which automatically shifts gutter 30 back and forth between troughs 31 and 32 to effect the separation between the liquors as just referred to. At the beginning of the cycle gutter 30 is in its full line position shown in Fig. 2, and the original liquor which is then spinning out of basket 5, and draining down from curbing 28 through spout 29 onto gutter 30, is being directed into the original liquor trough 31. After all the original liquor in basket 5 has been spun out, the adjustment of the control device 50 is such that the wash fluid valve 89 is opened thereby allowing the wash fluid to flow through pipe 61 to nozzle 62, to spray upon the material in the revolving centrifugal basket 5. Within a few moments this washing fluid will commence to spin out of basket 5, and to drain down from curbing 28 through spout 29 onto gutter 30. It is desired however to collect this wash liquor in the wash liquor trough 32, instead of in the original liquor trough 31. To effect this result my arrangement shifts gutter 30 from its full line position to its dotted line position shown in Fig. 2, as follows: Pipe 61 is connected to a pipe 247. If the pressure of the washing fluid in pipe 61 is insufficient to actuate the gutter throwing cylinder 248 in a manner that will be subsequently described, then I interpose the following arrangement between pipe 247 and cylinder 248, for the purpose of permitting a substantially higher pressure to be supplied to the gate throwing cylinder 248. Pipe 247 enters a cylinder 249 having therein a movable piston and piston rod 250 the lower end of which enters a valve 251. In cylinder 249 there is a spring 252 of sufficient strength to raise piston rod 250 and close valve 251, when there is no water pressure on top of piston 250, i. e. when the corresponding wash fluid valve 89 at the control machine is closed. On one side valve 251 is connected by means of pipe 253 to some source of fluid under high pressure, the particular source of this supply being omitted from Fig. 2. On the other side valve 251 communicates with the gutter throwing cylinder 248 by means of the pipe connections 254 as shown. Consequently when the wash fluid valve 89 is opened so as to admit the wash fluid to pipe 61, a small portion of it will enter cylinder 249 through pipe 247. The pressure so set up above the piston in cylinder 249 will be sufficient to depress the piston rod 250, thereby opening the high pressure valve 251, and admitting high pressure fluid from pipe 253 to the gutter throwing cylinder 248 through piping 254. This fluid is of sufficient pressure to raise the piston and piston rod 255 of gate throwing cylinder 248, and in view of the connection between this piston rod and gutter 30, the latter is shifted from its full line position to its dotted line position, Fig. 2, thereby directing the wash fluid from spout 29 into the wash fluid trough 32. Obviously gutter 30 will be held in this dotted line position all through the washing period. At the end of this period, after the wash fluid valve 89 is closed, the pressure above piston 250 in cylinder 249 is removed, and spring 252 raises this piston so as to close the valve 251. Notwithstanding this, the fluid which is trapped in cylinder 248 will continue to hold piston 255 in its uppermost position, and gutter 30 will remain in its dotted line position, until the end of the cycle when these members are retrieved to their full line positions shown in Fig. 2, in the following manner. By means of piping 256 the gutter throwing cylinder 248 also communicates with a release valve 257. This valve is opened and closed by a forked lever 258. In the groove of this lever there operates a pin 259 which is securely fastened into ball 37 of the previously described charging gate 34. When this gate is closed as shown in Fig. 2, pin 259 holds lever 258 in such position that the release valve 257 is closed. This is the position of the parts at all times during the cycle, except for a short time at the beginning of the cycle when the charging gate is opened to take a new charge of the material into the centrifugal. When this latter action occurs, pin 259 shifts the forked lever 258 in such manner as to open release valve 257, and thereupon the weight 260 at the end of gutter 30 causes the latter to retrieve by forcing the liquor from cylinder 248 out through piping 256 and release valve 257. This retrieving action brings gutter 30 back to its full line position which it was originally in. Also when the full charge of the material has entered the centrifugal, the charging gate 34 is closed thereby closing release valve 257, and consequently when the washing action in the next cycle commences the gutter will again be thrown to its dotted line position in the manner above indicated, and so the shifting of this gutter will continue for cycle after cycle as the centrifuging proceeds and the original liquor will be separated from the wash liquor respectively in troughs 31 and 32, as described. Instead of the retrieving weight 260, any other suitable means for retrieving the gutter, can be used. In connection with this gutter throwing apparatus, the object of the fine regulating valve 246 in pipe 254 is as follows: Often it is desired to retard the actual shifting of gutter 30 for a substantial period of time after the wash fluid valve 89 has opened to commence the washing action. The reason for this is that at this moment, and for some time thereafter, the original liquor which should go into trough 31 is still clinging to the inner surface of curbing 28, and it is only after the first portions of the wash liquor have spun through the basket and washed the original liquor down from the curbing and out through spout 29, that the pure wash liquor to be collected in trough 32 comes down through spout 29. Therefore gutter 30 should not shift from trough 31 to trough 32 until this moment is reached. It is for the purpose of effecting this retarding action that the fine regulating valve 246 is supplied. By throttling this valve further and further, the rate at which the washing fluid enters cylinder 248 can be continuously reduced, until piston and piston rod 255 thereof move so slowly that gutter 30 passes from trough 31 to trough 32 only after all liquor containing traces of the original liquor have been discharged into trough 31. Thereafter only unadulterated wash liquor will come down, and this will all be discharged into the wash liquor trough 32.

Of course, if it is desired to change the amount of this retardation just referred to, it is apparent that same must be adjusted individually at each centrifugal, by individually adjusting the valve 246, or instead of such valve, a small button or plug, with a fine hole through it can be substituted in the pipe line 254, and valve 246 can then be omitted. If such flow plugs are used, and it is desired to change the amount of retardation, the old plugs must be changed for new ones having larger or smaller holes to give the desired retardation. But in both cases, either with the fine regulating valves 246, or with the flow plugs, it is necessary to individually adjust each centrifugal if it is desired to change this retardation of the gutter movement following the commencement of the washing action. Where this retardation of the gutter is of sufficient importance, and where its amount must be changed sufficiently often, this entire function of shifting the gutter 30 can be transferred to the control machine 50, and the time at which it occurs can there be collectively changed for all the centrifugals in a very simple manner, as follows: In each of the control sets A', B', C' and D', two more discs corresponding identically with the previously described discs 153 and 154 can be inserted between the previously described discs 154 and 155. This of course will lengthen out the machine, but it is simple to spread the end castings 78 and 79 further apart for this purpose and to proportionately lengthen all the intervening parts. Along with these two new discs there can be added an additional fluid valve identical in construction and mounting with the previously described wash fluid valve 89. But the new valves so added would be connected into pipes 254, Fig. 2, communicating with the gutter throwing cylinder 248 of each centrifugal. In this arrangement pipes 247, cylinder 252, valve 251 and regulating valve 246 would all be omitted. Also, on the control machine 50, for the purpose of respectively opening and closing each of these newly added gutter shifting valves, there would be added all the intervening levers to operate them from the newly added discs, in identically the same manner that the wash fluid valve 89 is opened and closed by its timing discs 153 and 154. In other words each of the sets of control parts A', B', C' and D' would be increased by duplicating therein discs 153 and 154, also valve 89, and all the connecting parts by which this valve is opened and closed by these discs. There would also be added two additional stop bars with stop members thereon, also means for mounting them, etc.—which would be practical duplicates of the previously described stop bars 164 and 166. It should be understood however, that all these new members are added only for the purpose of permitting the control machine 50 to perform this gutter throwing function in the above described manner, and for making it possible to collectively change the moment in the cycle at which the gutters 30 of the centrifugals are thrown. Since these parts, their mode of mounting, etc., are all duplicates of parts already shown and described, I have omitted these additional parts from the drawings because to include them would only greatly increase the complexity of the drawings which is inconsistent with the desired clearness of same. However, in the diagrammatic illustration of control machine 50 in Fig. 2, and as a part of the control set D', I have shown a short pipe 261 coming out from the machine beside the wash fluid pipe 61 of control set D'. This pipe 261 would come from the new fluid valve, and would be connected into pipe 254 in any suitable manner so as to supply the actuating fluid to the gutter flowing cylinder 248 of centrifugal D. Pipes similar to 261 would come from all the other control sections A', B' and C', and would similarly connect with the gutter throwing cylinders 248 of centrifugals A, B and C. When the actuating fluid is thus supplied to the gutter throwing cylinders 248 from the control machine 50, its effect is simply to lift the piston 255 thereof, and to throw the gutter 30 from its full line to its dotted line position in Fig. 2, and when the release valve 257 is opened at the end of the cycle, by opening the charging gate 34, gutter 30 will retrieve from its dotted line to its full line position under the action of the retrieving means which forces the fluid from cylinder 248 out through release valve 257 in the same manner as was previously described in connection with the alternative gutter throwing arrangement. It is obvious that when this gutter throwing function is performed by the control device 50, the precise time in the cycle at which it occurs can be collectively changed for all the centrifugals in the same manner that the other functions can be collectively changed for all the centrifugals, as previously described. The gutter 30 is shifted practically at the moment when its actuating valve on the control machine 50 is opened. No throttling valve equivalent to the previously described valve 246, Fig. 2, is used, because the entire retardation of the gutter movement is procured by the timing on control machine 50.

Before concluding the description of the control machine 50, I would like to point out that in special cases where additional steps are injected into the centrifugal cycle, above those previously described, it is possible to automatically perform the same by means of my control machine 50, by simply adding to each of the control sets A', B', C' and D', additional timing discs similar to discs 153, 154 and 155, together with additional stop rods and parts similar to stop bars 164, 166 and 168. These additional discs can perform the new functions, and the additional stop bars can be used to collectively change the time at which these functions are performed.

This now practically concludes the detailed description of the various parts and sub-combinations of parts embraced in my fully centralized automatic control equipment, and in view of the completeness of the preceding description, a very brief statement of the mode of operating this equipment will now suffice. Its operation is as follows: After the operator has loaded into any centrifugal a charge of material from mixer tank 1 through charging gate 34, the latter is closed. At this time gutter 30, Fig. 2, will be in its full line position adapted to direct the liquor into the original liquor trough 31. The operator next turns on the power to bring the centrifugal to full speed, and immediately thereafter he throws the three-way valve 56 into its engaging position, as shown under centrifugals A, B or D, in Fig. 1. By this action he places his centrifugal under the influence of its corresponding set of control parts on the control machine 50. The traveling mechanism of the latter then commences to travel to measure time, and after definite periods of time have elapsed as determined by the setting of the pointers, the following succession of cycle steps respectively occur: First, fluid valve 89 of the centrifugal is opened, and the washing fluid commences to spray upon the material in the revolving basket; second, gutter 30 is shifted from the original liquor trough 31 into which it had been directing the original liquor from spout 29, to the wash liquor trough 32, this being accomplished by the actuating fluid admitted to the gutter throwing cylinder 248, Fig. 2; third, the wash fluid valve 89 is closed, thereby terminating the washing action; and fourth, after a further spinning period during which the material in the basket is purged of the last portion of the washing fluid, and is dried, the centrifugal is stopped by admitting compressed air to the power and brake cylinders 52 and 53 if the centrifugals are belt driven, or to cylinders 55 if the centrifugals are electrically driven. When the centrifugal comes to rest the operator throws three-way valve 56 of that centrifugal into its release position as shown under centrifugal C in Fig. 1. As previously described this releases or disengages the set of control parts at machine 50 corresponding to that centrifugal, and these parts instantly retrieve and reset themselves at their initial positions awaiting the next cycle. This retrieving action immediately exhausts the compressed air from cylinders 52 and 53, or from cylinder 55, thereby completely freeing the centrifugal from the influence of the control machine 50. The operator then turns on a moderate amount of power to turn the centrifugal slowly which enables him to unload the material from the basket by means of his mechanical discharger as previously indicated. During the discharging action, the power and brake cylinders 52 and 53, or the cylinder 55, are entirely inert, or de-energized, and the operator is therefore free to turn the power on and off repeatedly to keep the centrifugal turning slowly, which is essential for safe discharging. The cylinders 52 and 53, or 55, offer virtually no resistance to this action, and the operator is practically unconscious of the fact that he is moving the cylinders along with the other parts. After the discharging is finished, the operator reloads the basket by opening the charging gate 34 by means of handle 36. As previously described this action opens release valve 257, Fig. 2, by means of pin 259, and the gutter retrieving means brings gutter 30 back to its full line position shown in Fig. 2. This is the position of the parts as described at the beginning of this paragraph, and consequently the next cycle, as well as all successive cycles will be repeated in the identical manner just described, and this holds true not only for one centrifugal, but for all of the centrifugals in the mixer group, until all the material in mixer tank 1 has been worked through the centrifugals. In the foregoing description it will be noticed that though the control machine 50 impresses a substantially identical cycle on all the centrifugals, nevertheless it permits them to operate in independent time relation of each other in all other ways. That is any centrifugal can be started at any time whatsoever independently of the others, and the various centrifugals can at any time be in the same or different phases of their cycles, although the total cycle impressed upon any centrifugal will be substantially alike and uniform for all the centrifugals. When the character of the material coming to the centrifugals from mixer tank 1, changes for any of the previously described reasons, the various time intervals separating the above described cycle steps, can be quickly changed for all the centrifugals, thereby always keeping the centrifugals operating on the cycle that best suits the immediate condition of the material that is being supplied to them. These adjustments are made by aid of the collective adjusting means previously described. These affect all the centrifugals in the mixer group practically simultaneously. If, for any reason, individual adjustment should be desired for any centrifugal, the same can be procured by means of adjusting screws 243 shown in Fig. 8ª, but as previously indicated it is advisable to keep all the centrifugals running absolutely uniformly, so that the uniform collective adjustments on control machine 50 need only be resorted to.

At the beginning of the cycle, instead of requiring the operator to place a centrifugal under the influence of control machine 50 by manually operating the three-way valve 56, this valve can be arranged so as to be automatically shifted into its engaging position by the act of throwing the power onto the centrifugal to bring it up to high speed. This arrangement is shown in Fig. 1ª as applied to belt driven centrifugals, but the arrangement is equally simple and obvious in connection with the electric driven centrifugals. In Fig. 1ª the position of, and all connections to, valve 56 are identical with those illustrated in Figs. 1 and 2. That is port 56′ of valve 56 is connected to the compressed air supply line 57; the port 56² is connected to the engaging mechanism at the control machine 50 by means of tube 58; and the exhaust port 56³ is open to the atmosphere. Likewise, the full line position 59 of the valve handle, corresponds to the engaging position of the valve, and the dotted line position 59′ of this valve handle corresponds to the release position of the valve. In this arrangement however, as illustrated in Fig. 1ª, valve 56 is located in close proximity to the previously described power control shaft 18. On this shaft 18 there is rigidly fastened a crank or cam 262 which is adapted to rotate with shaft 18 as the power is thrown on or off of the centrifugal by means of this shaft as previously described. For purposes of clearness, in Fig. 1ª, all parts connected to shaft 18 have been omitted except the cam 262. The relation between shaft 18, cam 262, valve 56 and valve operating handle 59 are such that the following operations are realized. Prior to the opening of the cycle the valve handle is in its released position 59′, and the centrifugal is free from the control machine 50. At this time there is no power on the centrifugal, and cam 262 is in its dotted line position shown in Fig. 1ª. If the operator then turns the full power onto the centrifugal by means of hand wheel 19, Figs. 1 and 2, this turns shaft 18 in such manner as to carry cam 262 from its dotted line position to its full line position as shown in Fig. 1ª. During the course of this action, cam 262 engages valve handle 59 at its dotted line position in Fig. 1ª and carries it through to its full line position, which as previously indicated is the engaging position for the valve. In other words the mere action of throwing the power onto the centrifugal, automatically shifts valve lever 59 from its release position to its engaging position, thereby automatically placing the centrifugal under the influence of the control machine, instead of requiring the operator to do this manually as in Figs. 1 and 2. At the end of the cycle when the power is automatically cut off by action of cylinder 52, cam 262 moves from its full line position to its dotted line position as shown in Fig. 1ª. The centrifugal comes to rest, and when the operator then desires to release the centrifugal from the control machine he shifts valve handle 59 from its full line to its dotted line position as shown in Fig. 1ª. Thereafter the operations are repeated as indicated.

In conclusion, I wish to call attention to the fact that several features of my equipment can be used separately and independently of the entire combined equipment which I have previously described. For instance, in some applications of this invention there is no necessity of making any separation between the different liquors spun off from the centrifugals, and in this case the two troughs 31 and 32 can be replaced by a single trough, and the previously described gutter shifting equipment can be omitted. Also in other applications of this invention there is no necessity for washing the material in the basket, and in these cases the washing equipment can be omitted, and such remaining portions of the equipment can be used as are required. Also other groupings of various parts and features of the previously described equipment can be made. It is my intention however, to cover in this application all such groupings and sub-combinations of the parts and features, irrespective of whether they are used separately, or in relations other than the precise ones herein shown, or whether they are used in connection with the complete combined equipment as described herein.

Realizing that my equipment is subject to many modifications within the broad spirit of my invention, I do not limit myself except as expressly stated in the following claims.

Subject matter of invention shown or described but not claimed in this application is reserved and claimed by me in other applications.

This application is a continuation in part of my two copending applications bearing respectively Serial Number 193,647, filed May 23, 1927, and Serial Number 206,726, filed July 18, 1927.

I claim:

1. In combination, a plurality of centrifugals, a wash fluid valve for each centrifugal, automatic control means adapted to control all of said centrifugals independently of each other but according to a cycle, said cycle including the opening of the wash fluid valve of any centrifugal after a predetermined period of time and the closing of said wash fluid valve of that centrifugal after another predetermined period of time, and adjusting means adapted to separately change each of said two predetermined periods of time simultaneously for all of said centrifugals.

2. In combination, a plurality of centrifugals, a wash fluid valve for each centrifugal, automatic control means adapted to control all of said centrifugals independently of each other but according to a cycle, said cycle including the opening of the wash fluid valve of any centrifugal after a predetermined period of time, the closing of said wash fluid valve of that centrifugal after another predetermined period of time, and the stopping of that centrifugal after another predetermined period of time, and adjusting means adapted separately to change each of said three predetermined periods of time simultaneously for all of said centrifugals.

3. In combination, a plurality of centrifugals, a wash fluid valve for each centrifugal, means for stopping each centrifugal, automatic control means adapted to control all of said centrifugals independently of each other but according to a cycle, said cycle including the opening of the wash fluid valve of any centrifugal after a predetermined period of time, the closing of said wash fluid valve of that centrifugal after another predetermined period of time, and the stopping of that centrifugal after another predetermined period of time, means adapted to change the first of said predetermined periods of time simultaneously for all of said centrifugals, other means adapted to change the second of said predetermined periods of time simultaneously for all of said centrifugals, and other means adapted to change the third of said predetermined periods of time simultaneously for all of said centrifugals.

4. In combination, a plurality of centrifugals, a wash fluid valve for each centrifugal, means for stopping each centrifugal, automatic control means adapted to control all of said centrifugals independently of each other but according to a time cycle that is uniform for all of said centrifugals, said uniform cycle including the opening of the wash fluid valve of any centrifugal after a predetermined period of time uniform for all of said centrifugals, the closing of said wash fluid valve of that centrifugal after another predetermined period of time uniform for all of said centrifugals and the stopping of said centrifugal after another predetermined period of time uniform for all of said centrifugals, means adapted to change the first of said predetermined periods of time simultaneously and uniformly for all of said centrifugals, other means adapted to change the second of said predetermined periods of time simultaneously and uniformly for all of said centrifugals, and other means adapted to change the third of said predetermined periods of time simultaneously and uniformly for all of said centrifugals.

5. In combination, a plurality of centrifugals, a wash fluid valve for each centrifugal, automatic control means adapted to automatically control all of said centrifugals, means for placing each of said centrifugals under the influence of said automatic control means independently of the other centrifugals, said automatic control means being adapted to automatically control said centrifugals by opening the wash fluid valve of any centrifugal after a predetermined period of time, by subsequently closing said valve of that centrifugal after another predetermined period of time, and by subsequently stopping that centrifugal after another predetermined period of time, adjusting means whereby the first of said predetermined periods of time can be changed simultaneously for all of said centrifugals, adjusting means whereby the second of said predetermined periods of time can be changed simultaneously for all of said centrifugals, and adjusting means whereby the third of said predetermined periods of time can be changed simultaneously for all of said centrifugals, each of said three adjusting means being adjustable independently of the other two adjusting means.

6. In combination, a plurality of centrifugals, a wash fluid valve for each centrifugal, automatic control means adapted to automatically control all of said centrifugals according to a cycle, means for placing each of said centrifugals under the influence of said automatic control means independently of the other said centrifugals, said automatic control means being adapted to control each of said centrifugals by opening the wash fluid valve of that centrifugal after a predetermined period of time measured from the moment when that centrifugal was placed under the influence of said automatic control means, by subsequently closing this valve after another predetermined period of time, and by subsequently stopping that centrifugal after another predetermined period of time, means adapted to change the first of said predetermined periods of time simultaneously for all of said centrifugals, other means adapted to change the second of said predetermined periods of time simultaneously for all of said centrifugals, and other means adapted to change the third of said predetermined periods of time simultaneously for all of said centrifugals.

7. In combination, a plurality of centrifugals adapted to centrifuge material charged therein, a nozzle for each centrifugal adapted to spray a washing fluid onto the material in its centrifugal, a wash fluid valve for each centrifugal connected with the nozzle of that centrifugal, means for automatically opening any of said wash fluid valves independently of the other after a predetermined period of time, means for automatically closing each valve after it has been open for a predetermined period of time, adjusting means adapted to change the first of said predetermined periods of time simultaneously for all of said centrifugals, and adjusting means adapted to change the second of said predetermined periods of time simultaneously for all of said centrifugals, each of said adjusting means being adjustable independently of the other one.

8. In combination, a plurality of centrifugals adapted to centrifuge material charged therein, a nozzle for each centrifugal adapted to spray a washing fluid onto the material in its centrifugal, a wash fluid valve for each centrifugal connected with the nozzle of that centrifugal, means for automatically opening any of said wash fluid valves independently of the other after a predetermined period of time, means for automatically closing each valve after it has been open for a predetermined period of time, means for automatically stopping the centrifugal corresponding to that valve after a predetermined period of time, adjusting means adapted to change the first of said predetermined periods of time simultaneously for all of said centrifugals, other adjusting means adapted to change the second of said predetermined periods of time simultaneously for all of said centrifugals, and other adjusting means adapted to change the third of said predetermined periods of time simultaneously for all of said centrifugals.

9. In combination, a plurality of centrifugals adapted to centrifuge material charged therein, a wash fluid valve for each centrifugal adapted to turn on and off a washing fluid for washing the material in its centrifugal, automatic control means for automatically controlling all of said centrifugals, means for placing each of said centrifugals under the influence of said automatic control means independently of the other centrifugals, said automatic control means being adapted to open the wash fluid valve of a centrifugal at the end of a predetermined period of time after said centrifugal was placed under the influence of said automatic control means, said automatic control means being also adapted to close said wash fluid valve of that centrifugal at the end of another predetermined period of time after that centrifugal was placed under the influence of said automatic control means, said automatic control means being also adapted to stop that centrifugal at the end of still another predetermined period of time after that centrifugal was placed under the influence of said automatic control means, said automatic control means having provision for changing the first of said predetermined periods of time simultaneously for all of said centrifugals, said automatic control means also having provision for changing the second of said predetermined periods of time simultaneously for all of said centrifugals, and said automatic control means also having provision for changing the third of said predetermined periods of time simultaneously for all of said centrifugals, such changing of any one of said predetermined periods of time having no effect on the other of said predetermined periods of time.

10. In combination, a plurality of centrifugals adapted to centrifuge material charged therein, a wash fluid valve for each centrifugal adapted to turn on and off a washing fluid for washing the material in its centrifugal, automatic control means for automatically controlling all of said centrifugals independently of each other, said automatic control means including sets of control parts one set for each centrifugal, each set of control parts being adapted to automatically open the wash fluid valve of its centrifugal after a predetermined period of time, to automatically close the said wash fluid valve of its centrifugal after a further predetermined period of time and to automatically stop its centrifugal after a still further predetermined period of time, means whereby the first of said predetermined periods of time can be changed simultaneously for all of said centrifugals, other means whereby the second of said predetermined periods of time can be changed simultaneously for all of said centrifugals and other means whereby the third of said predetermined periods of time can be changed simultaneously for all of said centrifugals.

11. In combination, a plurality of centrifugals adapted to centrifuge material charged therein, a wash fluid valve for each centrifugal adapted to turn on and off a washing fluid for washing the material in its centrifugal, automatic control means including sets of control parts one set for each centrifugal, each set of control parts being adapted to open the wash fluid valve of its centrifugal after a predetermined period of time and to close said wash fluid valve of its centrifugal after another predetermined period of time, said automatic control means having provision whereby the first of said predetermined periods of time can be changed simultaneously for all of said centrifugals, and said automatic control means also having provision whereby the second of said predetermined periods of time can be changed simultaneously for all of said centrifugals and by an amount that is independent of the amount that the first said period is changed.

12. In combination, a plurality of centrifugals, adapted to centrifuge material charged therein, a wash fluid valve for each centrifugal adapted to turn on and off a washing fluid for washing the material in its centrifugal, automactic control means for automatically controlling said centrifugals, said automatic control means including sets of control parts one set for each centrifugal, means for placing each centrifugal under the influence of its set of control parts independently of the other centrifugals, each set of control parts being adapted to open the wash fluid valve of its centrifugal at the end of a predetermined period of time after that centrifugal was placed under its influence, to close the wash fluid valve of its centrifugal after another predetermined period of time, and to stop its centrifugal after another predetermined period of time, means adapted to change the first of said predetermined periods of time simultaneously for all of said centrifugals, other means adapted to change the second of said predetermined periods of time simultaneously for all of said centrifugals, and other means adapted to change the third of said predetermined periods of time simultaneously for all of said centrifugals.

13. In combination, a plurality of centrifugals adapted to centrifuge material charged therein, a wash fluid valve for each centrifugal adapted to turn on and off a washing fluid for washing the material in its centrifugal, automatic control means for automatically controlling all of said centrifugals, said automatic control means including sets of control parts one set for each centrifugal, each set of control parts having traveling mechanism adapted to open the wash fluid valve of its centrifugal after a predetermined amount of travel, to close the wash fluid valve of its centrifugal after another predetermined amount of travel, and to stop its centrifugal after still another predetermined amount of travel, said automatic control means having provision for simultaneously changing for all of said centrifugals the first of said predetermined amounts of travel required before the wash fluid valve is opened, said automatic control means having other provision for simultaneously changing for all of said centrifugals the second of said predetermined amounts of travel required before the wash fluid valve is closed, and said automatic control means having still other provision for simultaneously changing for all of said centrifugals the third of said predetermined amounts of travel required before the centrifugal is stopped.

14. In combination, a plurality of centrifugals adapted to centrifuge material charged therein, a wash fluid valve for each centrifugal adapted to turn on and off a washing fluid for washing the material in its centrifugal, automatic control means for automatically controlling all of said centrifugals, said automatic control means including sets of control parts one set for each centrifugal, each set of control parts having traveling mechanism adapted to measure time by the amount of travel and adapted to open the wash fluid valve of one centrifugal after a predetermined period of time, to close the wash fluid valve of that centrifugal after another predetermined period of time, and to stop that centrifugal after still another predetermined period of time, means adapted to change the first of said predetermined periods of time simultaneously for all of said centrifugals, means adapted to separately change the second of said predetermined periods of time simultaneously for all of said centrifugals, and means adapted to separately change the third of said predetermined periods of time simultaneously for all of said centrifugals.

15. In combination, a plurality of centrifugals adapted to centrifuge material charged therein, a wash fluid valve for each centrifugal adapted to turn on and off a washing fluid for washing the material in its centrifugal, automatic control means for automatically controlling all of said centrifugals, said automatic control means including sets of control parts one set for each centrifugal, each set of control parts having traveling mechanism comprising rotatably mounted members adapted to measure time by the amount of rotation and adapted to open the wash fluid valve of one centrifugal after a predetermined period of time, to close the wash fluid valve of that centrifugal after another predetermined period of time, and to stop that centrifugal after still another predetermined period of time, means adapted to change the first of said predetermined periods of time simultaneously for all of said centrifugals, means adapted to separately change the second of said predetermined periods of time simultaneously for all of said centrifugals, and means adapted to separately change the third of said predetermined periods of time simultaneously for all of said centrifugals.

16. In combination, a plurality of centrifugals adapted to centrifuge material charged therein, a wash fluid valve for each centrifugal adapted to turn on and off a washing fluid for washing the material in its centrifugal, means for stopping each centrifugal, automatic control means for automatically controlling all of said centrifugals, said automatic control means including sets of control parts one set for each centrifugal, each set of control parts having traveling mechanism comprising rotatable members mounted to rotate about an axis common to all of said members, the said traveling mechanism of each set of control parts being adapted to measure time by the amount of said rotation and being also adapted to open the wash fluid valve of one centrifugal after a predetermined period of time, to close the wash fluid valve of that centrifugal after another predetermined period of time, and to actuate the means for stopping that centrifugal after still another predetermined period of time, means adapted to change the first of said predetermined periods of time simultaneously for all of said centrifugals, other means adapted to change the second of predetermined periods of time simultaneously for all of said centrifugals, and still other means adapted to change the third of said predetermined periods of time simultaneously for all of said centrifugals.

17. In combination, a plurality of centrifugals adapted to centrifuge materials charged therein, a wash fluid valve for each centrifugal adapted to turn on and off a washing fluid for washing the material in its centrifugal, automatic control means for automatically controlling all of said centrifugals, said automatic control means including sets of control parts one set for each centrifugal, each set of control parts having traveling mechanism comprising rotatable members mounted to rotate about an axis common to all of said members, one of said rotatable members being adapted to open the wash fluid valve of a centrifugal after a predetermined period of time, another of said rotatable members being adapted to close the said wash fluid valve of that centrifugal after another predetermined period of time, and another of said rotatable members being adapted to stop that centrifugal after another predetermined period of time, means adapted to change the first of said predetermined periods of time simultaneously for all of said centrifugals, means adapted to change the second of said predetermined periods of time simultaneously for all of said centrifugals and means adapted to change the third of said predetermined periods of time simultaneously for all of said centrifugals.

18. In combination, a centrifugal adapted to centrifuge material charged therein, a wash fluid valve adapted to turn on and off a washing fluid for washing the material in said centrifugal, means for stopping said centrifugal, automatic control means for automatically controlling said centrifugal, said automatic control means including rotatably mounted timing members, a constantly rotating actuating shaft adapted to have mechanical engagement with all of said rotatably mounted timing members for rotating same to measure time, one of said rotatably mounted timing members being adapted to mechanically open said wash fluid valve after a predetermined period of time, another of said rotatably mounted timing members being adapted to close said wash fluid valve after another predetermined period of time, and another of said rotatably mounted timing members being adapted to actuate said means for stopping the centrifugal after another predetermined period of time, a separate adjustable stop for each of said three rotatably mounted timing members, and retrieving means adapted to retrieve each of said rotatably mounted timing members against its own stop.

19. In combination, a centrifugal adapted to centrifuge material charged therein, a wash fluid valve adapted to turn on and off a washing fluid for washing the material in said centrifugal, means for stopping said centrifugal, automatic control means for automatically controlling said centrifugal, said automatic control means including movably mounted timing members, a constantly rotating actuating shaft adapted to transmit power to all of said movably mounted timing members for moving same to measure time, one of said movably mounted timing members being adapted to mechanically open said wash fluid valve after a predetermined period of time, another of said movably mounted timing members being adapted to close said wash fluid valve after another predetermined period of time, and another of said movably mounted timing members being adapted to actuate said means for stopping the centrifugal after another predetermined period of time, a separate adjustable stop for each of said three movably mounted timing members, and retrieving means adapted to retrieve each of said movably mounted timing members agaihts its own stop.

20. In combination, a centrifugal adapted to centrifuge material charged therein, a wash fluid valve adaped to turn on and off a washing fluid for washing the material in said centrifugal, means for stopping said centrifugal, automatic control means adapted to automatically control said centrifugal, said automatic control means including rotatably mounted timing members adapted to rotate about a common axis, actuating means adapted to move said timing members to measure time, one of said rotatably mounted timing members being adapted to open said wash fluid valve after a predetermined period of time, another of said rotatably mounted timing members being adapted to close said wash fluid valve after another predetermined period of time, and another of said rotatably mounted timing members being adapted to actuate said means for stopping the centrifugal after it has measured a predetermined period of time, a separate adjustable stop for each of said three rotatably mounted timing members, and retrieving means for retrieving each of said rotatably mounted timing members against its own stop.

21. In combination, a centrifugal adapted to centrifuge material charged therein, a wash fluid valve adapted to turn on and off a washing fluid for washing the material in said centrifugal, means for stopping said centrifugal, automatic control means for automatically controlling said centrifugal, said automatic control means including a shaft adapted to rotate at a substantially constant rate of speed, rotary timing members loosely mounted on said shaft and normally loose from each other, means adapted to engage said timing members to cause them to rotate with said shaft said means being also adapted to release said rotary timing members from such engagement with said shaft, one of said rotary timing members being adapted to open said wash fluid valve after the timing member has rotated through a predetermined angle with said shaft, another of said rotary timing members being adapted to close said wash fluid valve after that timing member has rotated through a predetermined angle with said shaft, and another of said rotary timing members being adapted to actuate said means for stopping said centrifugal after it has rotated through a predetermined angle with said shaft, a separate adjustable stop for each of said three rotary timing members, and retrieving means adapted to retrieve each of said rotary timing members against its own stop after said timing members are released from engagement with said rotating shaft.

22. In combination, a plurality of centrifugals adapted to centrifuge material charged therein, a wash fluid valve for each centrifugal adapted to turn on and off a washing fluid for washing the material in its centrifugal, means for stopping each centrifugal, automatic control means for automatically controlling all of said centrifugals, said automatic control means including sets of control parts one set for each centrifugal, each set of control parts including movably mounted timing members adapted to measure time by the amount of their movement, one of said movably mounted timing members in each of said sets of control parts being adapted to open the wash fluid valve of one centrifugal after having traveled through a distance corresponding to a predetermined period of time, another of said movably mounted timing members in each of said sets of control parts being adapted to close the wash fluid valve of its corresponding centrifugal after having traveled through a distance corresponding to a predetermined period of time, and another of said movably mounted timing members in each of said sets of control parts being adapted to actuate the said means for stopping its corresponding centrifugal after it has traveled through a distance corresponding to a predetermined period of time, adjustably mounted stop means for serving in common the first said group of movably mounted timing members which open the wash fluid valves of the various centrifugals, adjustably mounted stop means for serving in common the second said group of movably mounted timing members which close the wash fluid valves of the various centrifugals, and adjustably mounted stop means for serving in common the third said group of movably mounted timing members which effect the stopping of the various centrifugals, each of said movably mounted timing members being adapted to be retrieved against its own said stop means, and each of said stop means being adjustably mounted to permit the collective changing of the position at which all the said timing members served by that stop means are arrested during the retrieving movement.

23. In combination, a plurality of centrifugals adapted to centrifuge material charged therein, a wash fluid valve for each centrifugal adapted to turn on and off a washing fluid for washing the material in its centrifugal, means for stopping each centrifugal, automatic control means for automatically controlling all of said centrifugals, said automatic control means including sets of control parts one set for each centrifugal, each set of control parts including rotatably mounted timing members adapted to measure time by the amount of their rotation, one of said rotatably mounted timing members in each of said sets of control parts being adapted to open the wash fluid valve of one centrifugal after having rotated through a distance corresponding to a predetermined period of time, another of said rotatably mounted timing members in each of said sets of control parts being adapted to close the wash fluid valve of its corresponding centrifugal after having rotated through a distance corresponding to a predetermined period of time, and another of said rotatably mounted timing members in each of said sets of control parts being adapted to actuate the said means for stopping its corresponding centrifugal after it has rotated through a distance corresponding to a predetermined period of time, adjustably mounted stop means for serving in common the first said group of rotatably mounted timing members which open the wash fluid valves of the various said centrifugals, adjustably mounted stop means for serving in common the second said group of rotatably mounted timing members which close the wash fluid valves of the various said centrifugals, and adjustably mounted stop means for serving in common the third said group of rotatably mounted timing members which effect the stopping of the various said centrifugals, each of said rotatably mounted timing members being adapted to be retrieved against its own said stop means, and each of said stop means being adjustably mounted to permit the collective changing of the position at which all the said timing members served by that stop means are arrested during the retrieving movement.

24. In combination, a plurality of centrifugals adapted to centrifuge material therein, a wash fluid valve for each centrifugal adapted to turn on and off a washing fluid for washing the material in its centrifugal, means for stopping each centrifugal, automatic control means for automatically controlling all of said centrifugals, said automatic control means including sets of control parts one set for each centrifugal, each set of control parts including rotatable timing members, all of said rotatable timing members of all of said sets of control parts being mounted to rotate about a common axis, means adapted to rotate said timing members to measure time by the amount of their rotation about the common axis, one of said rotatably mounted timing members in each of said sets of control parts being adapted to open the wash fluid valve of one centrifugal after having rotated through a distance corresponding to a predetermined period of time, another of said rotatably mounted timing members in each of said sets of control parts being adapted to close the wash fluid valve of its corresponding centrifugal after having rotated through a distance corresponding to a predetermined period of time, and another of said rotatably mounted timing members in each of said sets of control parts being adapted to actuate the said means for stopping its corresponding centrifugal after it has rotated through a distance corresponding to a predetermined period of time, adjustably mounted stop means for serving in common the first said group of rotatably mounted timing members which open the wash fluid valves of the various said centrifugals, adjustably mounted stop means for serving in common the second said group of rotatably mounted timing members which close the wash fluid valves of the various said centrifugals, and adjustably mounted stop means for serving in common the third said group of rotatably mounted timing members which effect the stopping of the various said centrifugals, each of said rotatably mounted timing members being adapted to be retrieved against its own stop means, and each of said stop means being adjustably mounted to permit the collective changing of the position at which all the said timing members served by that stop means are arrested during the retrieving movement.

25. In combination, a centrifugal, a rotatably mounted timing member, means including a part projecting into the path of said rotatable timing member and adapted to automatically stop said centrifugal after said timing member makes contact with said part that projects into its path, means normally tending to retrieve said timing member, and a stop for limiting the retrieving movement of said timing member, said stop occupying a normally fixed position while said timing member revolves, but said stop being adjustably mounted to permit varying the arc through which said timing member revolves before contacting with said part that projects into its path.

26. In combination, a centrifugal, a wash fluid valve adapted to turn on and off a washing fluid for washing the material in said centrifugal, a rotatably mounted timing member adapted to open said valve at a certain place during the rotation of said timing member, another rotatably mounted timing member adapted to close said valve at a certain place during the rotation of the last said timing member, means normally tending to retrieve both of said timing members, a stop for each of said timing members for limiting the amount of their retrieving movement, both of said stops occupying normally fixed positions while said timing members revolve, but said stops being adjustably mounted to vary the arcs through which said timing members revolve before respectively opening and closing said valve.

27. In combination, a centrifugal, control means for automatically stopping said centrifugal after a predetermined amount of time, said control means including a constantly rotating timing shaft that rotates always in the same direction, a timing member loosely mounted on said timing shaft, means for causing said timing member to rotate with said shaft, retrieving means normally tending to retrieve said timing member by rotation in a direction opposite to the constant rotation of said timing shaft, said timing member being adapted to stop said centrifugal when the timing member reaches a certain place in its rotation, said timing shaft being adapted to continue its rotation even when said centrifugal is stopped.

28. In combination, a plurality of centrifugals, a wash fluid valve for each centrifugal, automatic control means adapted to control all of said centrifugals independently of each other but according to a cycle, said cycle including the opening of the wash fluid valve of any centrifugal after a predetermined period of time and the closing of said wash fluid valve of that centrifugal after another predetermined period of time, one index plate adapted to indicate time intervals, and means for indicating the relative length of both said predetermined periods of time for all said centrifugals on that one index plate.

29. In combination, a plurality of centrifugals, a wash fluid valve for each centrifugal, automatic control means adapted to control all of said centrifugals independently of each other but according to a cycle, said cycle including the opening of the wash fluid valve of any centrifugal after a predetermined period of time, the closing of the wash fluid valve of that centrifugal after another predetermined period of time, and the stopping of that centrifugal after another predetermined period of time, one index plate adapted to indicate time intervals, and means for indicating the relative length of said three predetermined periods of time for all of said centrifugals on that one index plate.

30. In combination, a plurality of centrifugals, a wash fluid valve for each centrifugal, automatic control means adapted to control all of said centrifugals independently of each other but according to a cycle, said cycle including the opening of the wash fluid valve of any centrifugal after a predetermined period of time and the closing of said wash fluid valve of that centrifugal after another predetermined period of time, and adjusting means adapted to change each of said predetermined periods of time collectively for all of said centrifugals without changing the other said predetermined period of time.

31. In combination, a plurality of centrifugals, a wash fluid valve for each centrifugal, automatic control means adapted to control all of said centrifugals independently of each other but according to a cycle, said cycle including the opening of the wash fluid valve of any centrifugal after a predetermined period of time, the closing of said wash fluid valve of that centrifugal after another predetermined period of time, and the stopping of that centrifugal after another predetermined period of time, and adjusting means adapted to change each of said predetermined periods of time simultaneously for all of said centrifugals without changing the other of said predetermined periods of time.

32. In combination, a plurality of centrifugals, a wash fluid valve for each centrifugal, automatic control means adapted to automatically control all of said centrifugals, means for placing each of said centrifugals under the influence of said automatic control means independently of the other centrifugals, said automatic control means being adapted to automatically control said centrifugals by opening the wash fluid valve of any centrifugal after a predetermined period of time, by subsequently closing said valve of that centrifugal after another predetermined period of time, both said predetermined periods of time being measurable from the moment when said centrifugal was placed under the influence of said automatic control means, and adjusting means adapted to change each of said predetermined periods of time collectively for all of said centrifugals without changing the other said predetermined period of time.

33. In combination, a plurality of centrifugals, a wash fluid valve for each centrifugal, automatic control means adapted to automatically control all of said centrifugals, means for placing each of said centrifugals under the influence of said automatic control means independently of the other centrifugals, said automatic control means being adapted to automatically control said centrifugals by opening the wash fluid valve of any centrifugal after a predetermined period of time, by subsequently closing the valve of that centrifugal after another predetermined period of time, and by subsequent stopping that centrifugal after another predetermined period of time, all of said predetermined periods of time being measurable from the moment when said centrifugal was placed under the influence of said automatic control means, and adjusting means adapted to change each of said predetermined periods of time simultaneously for all of said centrifugals without changing the other of said predetermined periods of time.

34. In combination, a plurality of centrifugals adapted to centrifuge material charged therein, a wash fluid valve for each centrifugal adapted to turn on and off a washing fluid for washing the material in its centrifugal, automatic control means including sets of control parts, one set for each centrifugal, each set of control parts being adapted to open the wash fluid valve of its centrifugal after a predetermined period of time and to close said wash fluid valve of its centrifugal after another predetermined period of time, and adjusting means adapted to change each of said predetermined periods of time collectively for all of said centrifugals without changing the other of said predetermined period of time.

35. In combination, a plurality of centrifugals, adapted to centrifuge material charged therein, a wash fluid valve for each centrifugal adapted to turn on and off a washing fluid for washing material in its centrifugal, automatic control means including sets of control parts one set for each centrifugal, each set of control parts being adapted to open the wash fluid valve of its centrifugal after a predetermined period of time, to close said wash fluid valve of its centrifugal after another predetermined period of time, and to stop its centrifugal after another predetermined period of time, and adjusting means adapted to change each of said predetermined periods of time collectively for all of said centrifugals, without changing the other of said predetermined periods of time.

36. In combination, a plurality of rotatable centrifugals, a wash fluid valve for each centrifugal, an automatic centrifugal control including substantially constantly rotating timing mechanism for measuring time, the rotation of said timing mechanism being independent of the rotation of said centrifugals, said automatic centrifugal control being adapted to control all of said centrifugals independently of each other but according to a cycle, said cycle including the opening of the wash fluid valve of any centrifugal after a predetermined period of time and the closing of said wash fluid valve of that centrifugal after another predetermined period of time, and adjusting means adapted to change each of said two predetermined periods of time collectively for all of said centrifugals.

37. In combination, a plurality of rotatable centrifugals, a wash fluid valve for each centrifugal, an automatic centrifugal control including rotating timing mechanism for measuring time, the rotation of said timing mechanism being independent of the rotation of said centrifugals, said automatic centrifugal control being adapted to control all of said centrifugals independently of each other but according to a cycle, said cycle including the opening of the wash fluid valve of any centrifugal after a predetermined period of time, the closing of said wash fluid valve of that centrifugal after another predetermined period of time, and the stopping of that centrifugal after another predetermined period of time, and adjusting means adapted to change each of said three predetermined periods of time collectively for all of said centrifugals.

38. In combination, a plurality of rotatable centrifugals, a wash fluid valve for each centrifugal, an automatic centrifugal control including rotating timing mechanism for measuring time, the rotation of said timing mechanism being independent of the rotation of said centrifugals, said automatic centrifugal control being adapted to control all of said centrifugals independently of each other but according to a cycle, said cycle including the opening of the wash fluid valve of any centrifugal after a predetermined period of time, the closing of said wash fluid valve of that centrifugal after another predetermined period of time, and the stopping of that centrifugal after another predetermined period of time, means adapted to change the first of said predetermined periods of time simultaneously for all of said centrifugals, means adapted to change the second of said predetermined periods of time simultaneously for all of said centrifugals, and means adapted to change the third of said predetermined periods of time simultaneously for all of said centrifugals.

39. In combination, a plurality of rotatable centrifugals, a wash fluid valve for each centrifugal, an automatic centrifugal control including rotatable timing mechanism for measuring time, the rotation of said timing mechanism being independent of the rotation of said centrifugals, means for placing each of said centrifugals under the influence of said automatic control means independent of each other, said automatic control means being adapted to automatically control said centrifugals by opening the wash fluid valve of any centrifugal after a predetermined period of time, and by subsequently closing said valve of that centrifugal after another predetermined period of time, both said predetermined periods of time being measurable from the moment when said centrifugal was placed under the influence of said automatic control means, adjusting means whereby the first of said predetermined periods of time can be changed collectively for all of said centrifugals, and adjusting means whereby the second of said predetermined periods of time can be changed collectively for all of said centrifugals.

40. In combination, a plurality of rotatable centrifugals, a wash fluid valve for each centrifugal, an automatic centrifugal control including substantially constantly rotating timing mechanism for measuring time, the rotation of said timing mechanism being independent of the rotation of said centrifugals, means for placing each of said centrifugals under the influence of said automatic control means independently of the other centrifugals, said automatic control means being adapted to automatically control said centrifugals by opening the wash fluid valve of any centrifugal after a predetermined period of time, by subsequently closing said valve of that centrifugal after another predetermined period of time, all of said predetermined periods of time being measurable from the moment when said centrifugal was placed under the influence of said automatic control means, and adjusting means whereby the first of said predetermined periods of time can be changed collectively for all of said centrifugals, adjusting means whereby the second of said predetermined periods of time can be changed collectively for all of said centrifugals, and adjusting means whereby the third of said predetermined periods of time can be changed collectively for all of said centrifugals.

41. In combination, a plurality of rotatable centrifugals, a wash fluid valve for each centrifugal, an automatic centrifugal control including movable timing mechanism for measuring time, the motion of said timing mechanism being independent of the rotation of said centrifugal, said automatic control means including sets of control parts one set for each centrifugal, each set of control parts being adapted to open the wash fluid valve of each centrifugal after a predetermined period of time and to close said wash fluid of its centrifugal after another predetermined period of time, said automatic control means having provision whereby the first of said predetermined periods of time can be changed collectively for all of said centrifugals, and said automatic control means also having provision whereby the second of said predetermined periods of time can be changed collectively for all of said centrifugals.

42. In combination, a plurality of rotatable centrifugals, a wash fluid valve for each centrifugal, an automatic centrifugal control including rotating timing mechanism for measuring time, the rotation of said timing mechanism being independent of the rotation of said centrifugals, said automatic control means including sets of control parts one set for each centrifugal, each set of control parts being adapted to open the wash fluid valve of its centrifugal after a predetermined period of time, to close said wash fluid valve of its centrifugal after another predetermined period of time, and to stop the centrifugal after another predetermined period of time, means adapted to change the first of said predetermined periods of time simultaneously for all of said centrifugals, means adapted to change the second of said predetermined periods of time simultaneously for all of said centrifugals, and means adapted to change the third of said predetermined periods of time simultaneously for all of said centrifugals.

43. In combination, a rotary centrifugal adapted to centrifuge material charged therein, a wash fluid valve adapted to turn on and off a washing fluid for washing the material in said centrifugal, automatic control means for controlling said centrifugal, said automatic control means including rotatably mounted timing means, a substantially constantly rotating actuating member rotating independently of the rotation of said centrifugal, engaging and disengaging means adapted to cause said rotatably mounted timing means to be rotated by said substantially constantly rotating actuating member to measure time, said rotatably mounted timing means being adapted to open said wash fluid valve after a predetermined period of time, to close said wash fluid valve after another predetermined period of time, and to stop said centrifugal after another predetermined period of time, stop means against which said rotatably mounted timing means can be retrieved, and means for retrieving said rotatably mounted timing means against said stop means.

44. In combination, a centrifugal adapted to centrifuge material charged therein, a wash fluid valve adapted to turn on and off a washing fluid for washing the material in said centrifugal, automatic control means for controlling said centrifugal, said automatic control means including a group of rotatably mounted timing members adjustable with relation to each other, a substantially constantly rotating actuating member rotating independently of the rotation of said centrifugal, engaging and disengaging means adapted to cause said group of rotatably mounted timing members to be rotated by said substantially constantly rotating actuating member to measure time, one of said rotatably mounted timing members being adapted to open said wash fluid valve after a predetermined period of time, another of said rotatably mounted timing members being adapted to close said wash fluid valve after another predetermined period of time, and another of said rotatably mounted timing members being adapted to stop said centrifugal after another predetermined period of time, stop means against which said group of rotatably mounted timing members can be retrieved, and means for retrieving said group of rotatably mounted timing members against said stop means.

45. In combination, a centrifugal adapted to centrifuge material charged therein, a wash fluid valve adapted to turn on and off a washing fluid for washing the material in said centrifugal, automatic control means for controlling said centrifugal, a group of timing members mounted to rotate in unison with each other about a common axis, said timing members being adjustable with relation to each other, a substantially constantly rotating actuating member rotating independently of the rotation of said centrifugal, engaging and disengaging means adapted to cause said group of rotatably mounted timing members to be rotated by said substantially constantly rotating actuating member to measure time, one of said rotatably mounted timing members being adapted to open said wash fluid valve after a predetermined period of time, another of said rotatably mounted timing members being adapted to close said wash fluid valve after another predetermined period of time, and another of said rotatably mounted timing members being adapted to stop said centrifugal after another predetermined period of time, stop means against which said group of rotatably mounted timing members can be retrieved, and means for retrieving said group of rotatably mounted timing members against said stop means.

46. In combination, a centrifugal, a wash fluid valve adapted to turn on and off a washing fluid for washing the material in said centrifugal, time controlled means for automatically opening said wash fluid valve after a predetermined period of time, said time controlled means including energy storing means adapted to store energy for opening said valve, restraining means for restraining the opening of said valve by said energy storing means prior to the expiration of said predetermined period of time, and means for actuating said restraining means to permit said energy storing means to open said valve when said predetermined period of time expires.

47. In combination, a plurality of rotatable centrifugals, means for starting said centrifugals in independent time relation of each other, automatic control means for automatically stopping said centrifugals independently of each other but after a predetermined period of time, said automatic control means having travelling timing mechanism the rate of travel of which is independent of the rotation of the centrifugals, and adjusting means adapted to change the length of said predetermined period of time collectively for all of said centrifugals.

48. In combination, a plurality of rotatable centrifugals, a wash fluid valve for each centrifugal, automatic control means adapted to automatically open the wash fluid valve of any centrifugal independently of the others but after a predetermined period of time, said automatic control means having travelling timing mechanism the rate of travel which is independent of the rotation of the centrifugals, and adjusting means adapted to change the length of said predetermined period of time collectively for all of said centrifugals.

49. In combination, a plurality of rotatable centrifugals, a wash fluid valve for each centrifugal, automatic control means adapted to automatically close the wash fluid valve of any centrifugal independently of the others but after a predetermined period of time, said automatic control means having travelling timing mechanism the travelling motion of which is independent of the rotation of the centrifugals, and adjusting means adapted to change the length of said predetermined period of time collectively for all of said centrifugals.

50. In combination, a plurality of centrifugals, automatic control mechanism for each centrifugal for automatically stopping its centrifugal independently of the other centrifugals but after a predetermined period of time, and a shaft adapted to revolve independently of the centrifugals, said shaft being adapted to actuate all of said automatic control mechanisms for all of said centrifugals to cause them to measure their said predetermined period of time.

51. In combination, a plurality of rotatable centrifugals, means for starting said centrifugals in independent time relation of each other, automatic control means for automatically stopping said centrifugals in independent time relation of each other but after a predetermined period of time, said automatic control means having rotatable timing mechanism the rotation of which is independent of the rotation of said centrifugals, and adjusting means adapted to change the length of said predetermined period of time simultaneously for all of said centrifugals.

52. In combination, a plurality of rotatable centrifugals, a wash fluid valve for each centrifugal, automatic control means adapted to automatically open the wash fluid valve of any centrifugal independently of the others but after a predetermined period of time, said automatic control means having rotatable timing mechanism the rotation of which is independent of the rotation of said centrifugals, and adjusting means adapted to change the length of said predetermined period of time collectively for all of said centrifugals.

53. In combination, a plurality of rotatable centrifugals, a wash fluid valve for each centrifugal, automatic control means adapted to automatically close the wash fluid valve of any centrifugal independently of the others but after a predetermined period of time, said automatic control means having rotatable timing mechanism the rotation of which is independent of the rotation of said centrifugals, and adjusting means adapted to change the length of said predetermined period of time simultaneously for all of said centrifugals.

54. In combination, a plurality of centrifugals, means for starting said centrifugals in independent time relation of each other, automatic control means for automatically stopping said centrifugals in independent time relation of each other, said automatic control means including a travelling member for each centrifugal, said travelling member being adapted to stop its centrifugal after a predetermined amount of travel, and adjusting means for collectively changing for all of said centrifugals the predetermined amount of travel required of said travelling members before they stop their respective centrifugals.

55. In combination, a plurality of centrifugals, a wash fluid valve for each centrifugal, automatic control means for automatically opening said wash fluid valves, said automatic control means including a travelling member for each centrifugal, said travelling member being adapted to open the wash fluid valve of its centrifugal after a predetermined amount of travel, and adjusting means for simultaneously changing for all of said centrifugals the predetermined amount of travel required of said travelling members before they open the wash fluid valves of their respective centrifugals.

56. In combination, a plurality of centrifugals, a wash fluid valve for each centrifugal, automatic control means for automatically closing said wash fluid valves, said automatic control means including a travelling member for each centrifugal, said travelling member being adapted to close the wash fluid valve of its centrifugal after a predetermined amount of travel, and adjusting means for collectively changing for all of said centrifugals the predetermined amount of travel required of said travelling members before they close said wash fluid valves of their respective centrifugals.

57. In combination, a plurality of centrifugals, means for starting said centrifugals in independent time relation of each other, automatic control means for automatically stopping said centrifugals, said automatic control means including a rotatably mounted member for each centrifugal adapted to stop its centrifugal after it has rotated through a predetermined arc, and adjusting means for simultaneously changing for all of said centrifugals the amount of said predetermined arc through which said members rotate before they stop their respective centrifugals.

58. In combination, a plurality of centrifugals, a wash fluid valve for each centrifugal, automatic control means for automatically opening said wash fluid valves, said automatic control means including a rotatably mounted member for each centrifugal adapted to open the wash fluid valve of its centrifugal after said member has rotated through a predetermined arc, and adjusting means for collectively changing for all of said centrifugals the amount of said predetermined arc through which said members rotate before they open the said wash fluid valves of their respective centrifugals.

59. In combination, a plurality of centrifugals, a wash fluid valve for each centrifugal, automatic control means for automatically closing said wash fluid valves, said automatic control means including a rotatably mounted member for each centrifugal adapted to close the wash fluid valve of its centrifugal after said member has rotated through a predetermined arc, and adjusting means for collectively changing for all of said centrifugals the amount of said predetermined arc through which said members rotate before they close the said wash fluid valves of their respective centrifugals.

60. In combination, a plurality of centrifugals, means for starting said centrifugals in independent time relation of each other, automatic control means for automatically stopping said centrifugals, said automatic control means including a travelling member for each centrifugal, said travelling member being adapted to measure time while travelling in one direction and being adapted at a certain position in its movement in that direction to automatically stop its centrifugal, means for retrieving said travelling members, and a stop means common to all of said travelling members of all of said centrifugals for arresting their retrieving motion at a certain position, the location of said stop means being adjustable to simultaneously change the position at which all of said travelling members are arrested during their said retrieving motion.

61. In combination, a plurality of centrifugals, a wash fluid valve for each centrifugal, automatic control means for automatically opening the wash fluid valves of said centrifugals in independent time relation of each other, said automatic control means including a travelling member for each centrifugal, said travelling member being adapted to measure time while travelling in one direction and being adapted at a certain position in its movement in that direction to automatically open said wash fluid valve of its centrifugal, means for retrieving said travelling members, and stop means common to all of said travelling members of all of said centrifugals for arresting their retrieving motion at a certain position, said stop means being adjustably mounted to collectively change the position at which all of said travelling members are arrested during their said retrieving motion.

62. In combination, a plurality of centrifugals, a wash fluid valve for each centrifugal, automatic control means for automatically closing the wash fluid valves of said centrifugals in independent time relation of each other, said automatic control means including a travelling member for each centrifugal, said travelling member being adapted at a certain position in its movement to automatically close said wash fluid valve of its centrifugal, means for retrieving said travelling members, and stop means common to all of said travelling members of all of said centrifugals for arresting their retrieving motion at a certain position, said stop means being adjustably mounted to collectively change the position at which all of said travelling members are arrected during their said retrieving motion.

In testimony whereof, I have executed these presents on this 31 day of August 1927, in the city and county of New York, State of New York.

ROBERT ALEXANDER STEPS.